No. 651,785. Patented June 12, 1900.
P., J. & P. W. SOMMER.
WIRE FABRIC MACHINE.
(Application filed Feb. 17, 1899.)
(No Model.) 12 Sheets—Sheet 1.
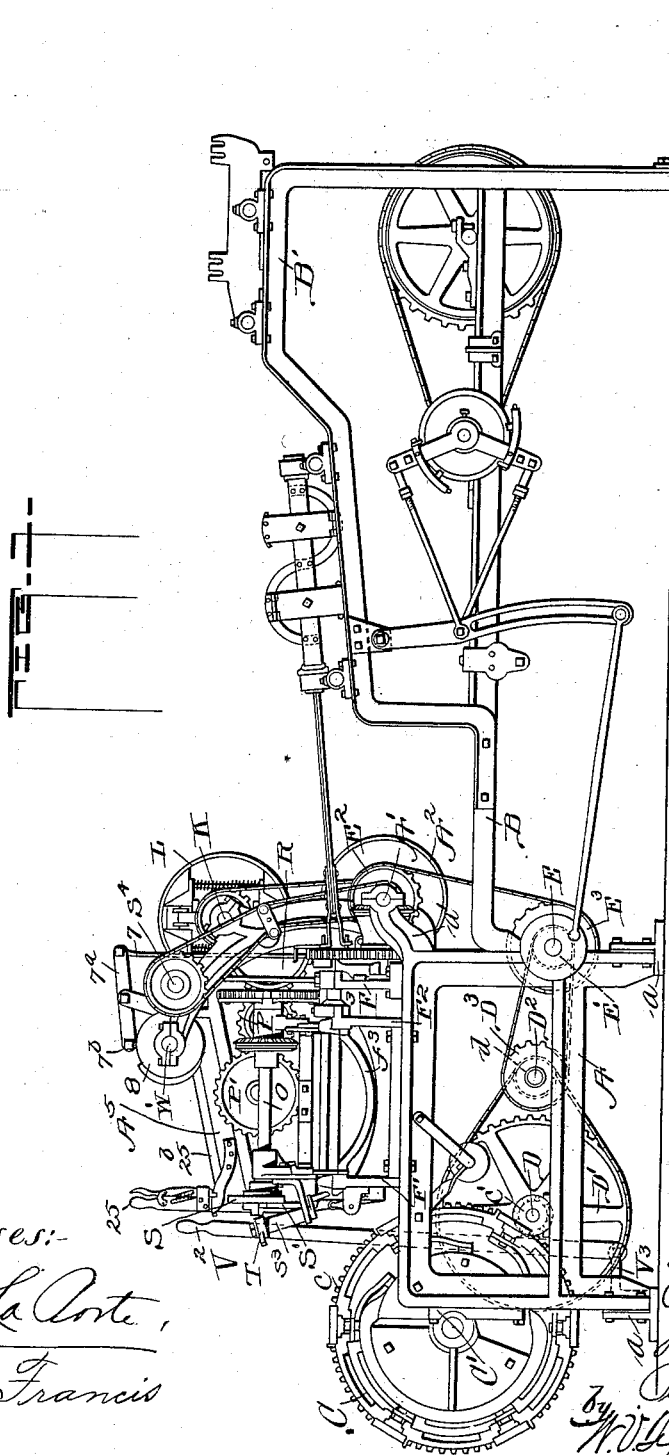

No. 651,785. Patented June 12, 1900.
P., J. & P. W. SOMMER.
WIRE FABRIC MACHINE.
(Application filed Feb. 17, 1899.)
(No Model.) 12 Sheets—Sheet 2.
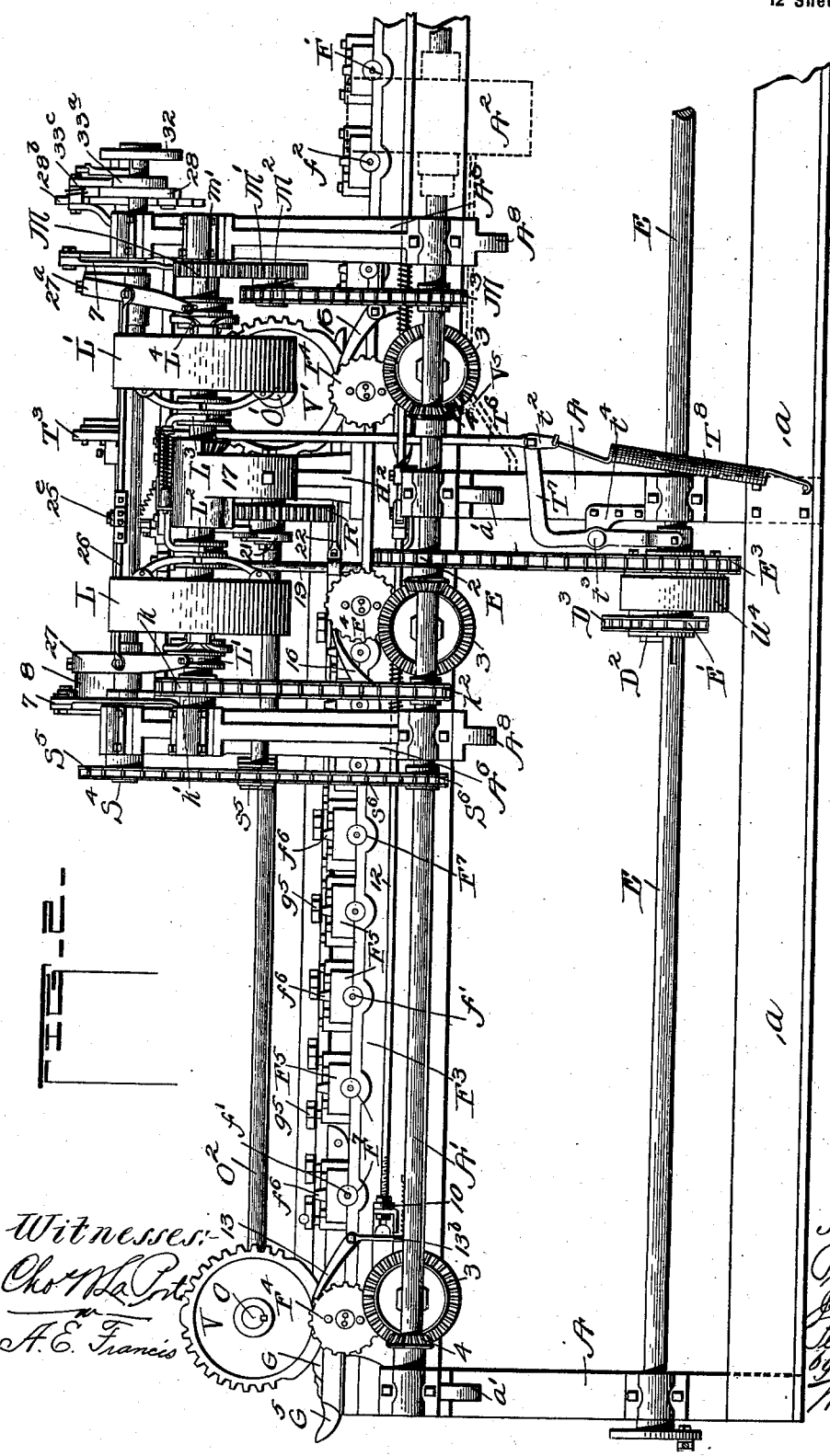

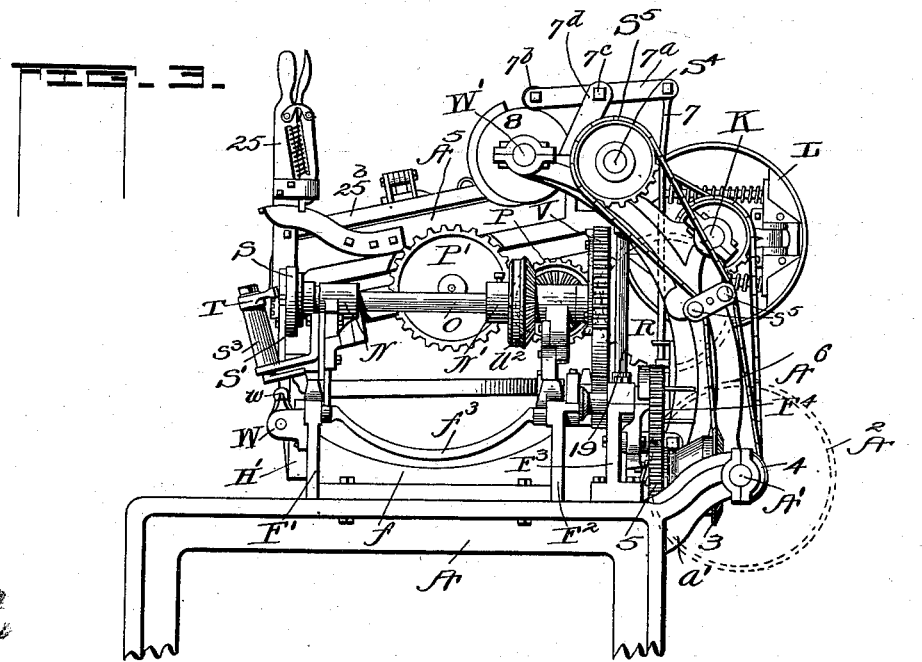

No. 651,785. Patented June 12, 1900.
P., J. & P. W. SOMMER.
WIRE FABRIC MACHINE.
(Application filed Feb. 17, 1899.)
(No Model.) 12 Sheets—Sheet 4.
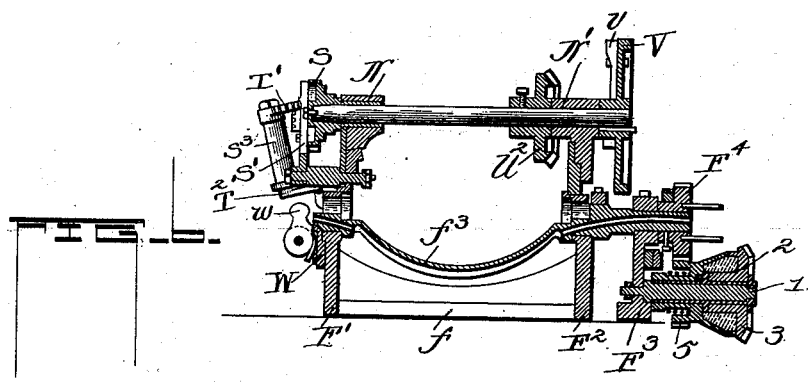
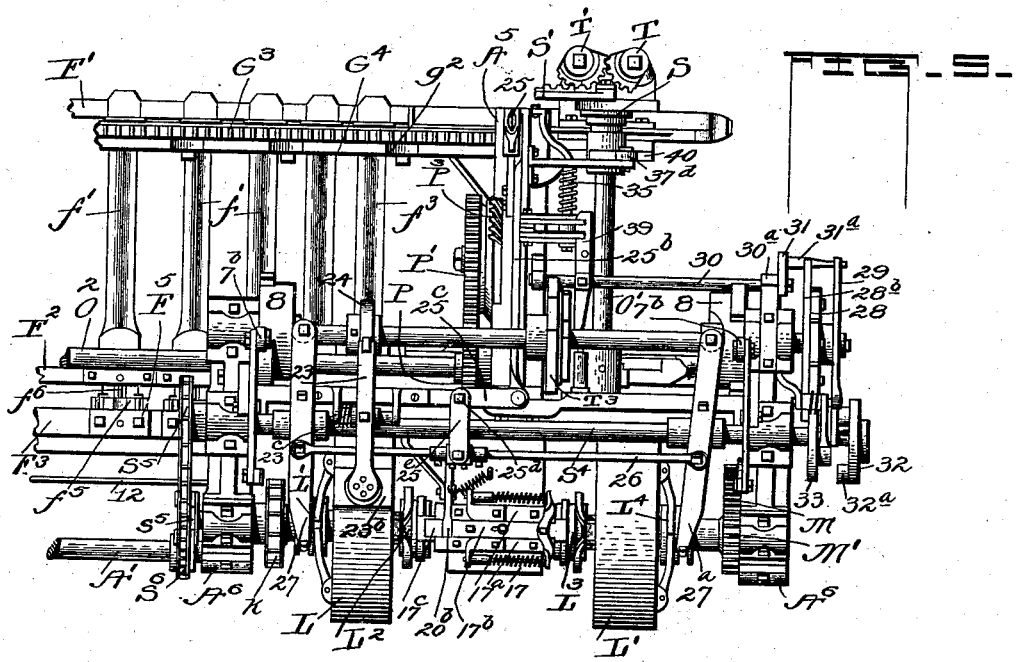
Witnesses:
Inventors
Peter Sommer
John Sommer
Peter W. Sommer No. 651,785. Patented June 12, 1900.
P., J. & P. W. SOMMER.
WIRE FABRIC MACHINE.
(Application filed Feb. 17, 1899.)
(No Model.) 12 Sheets—Sheet 5.
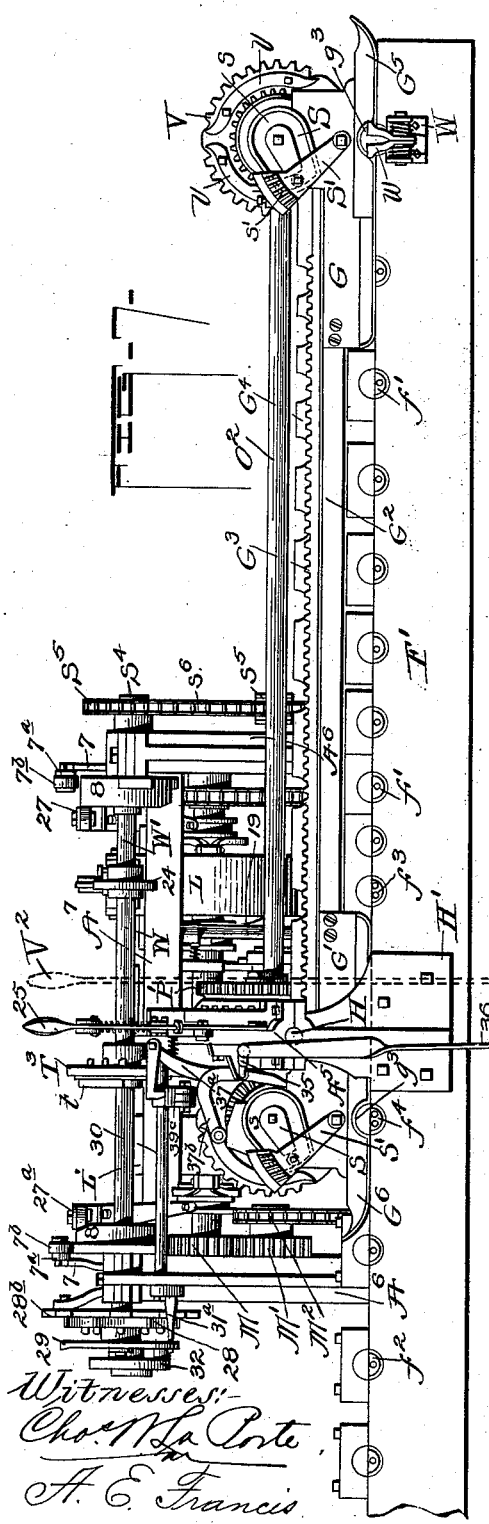
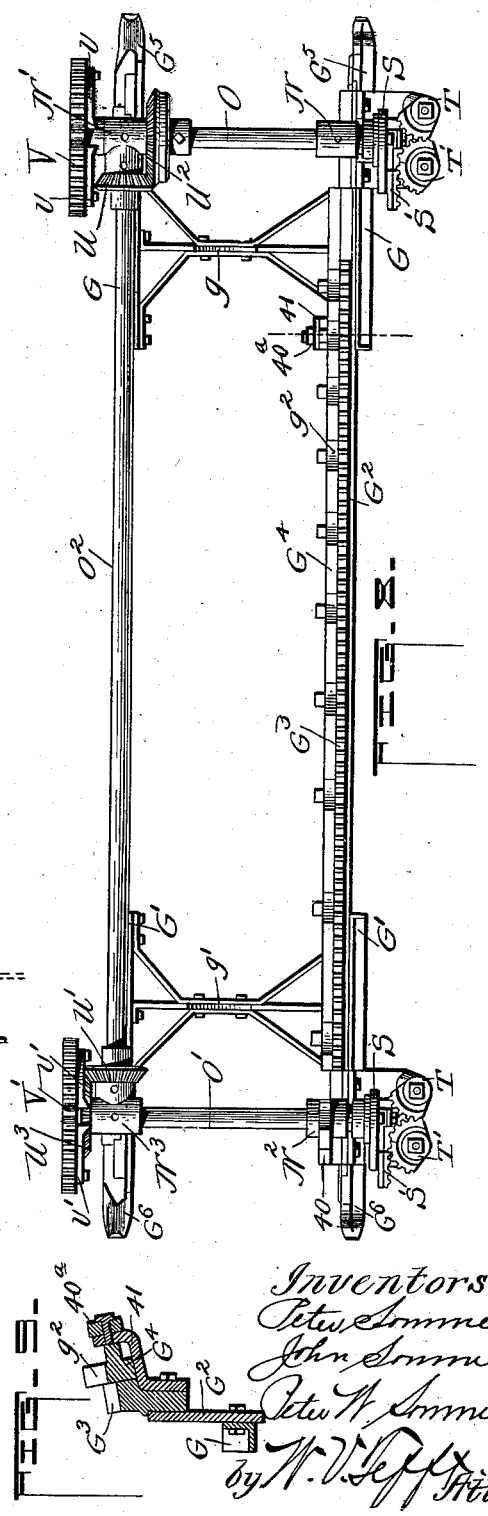

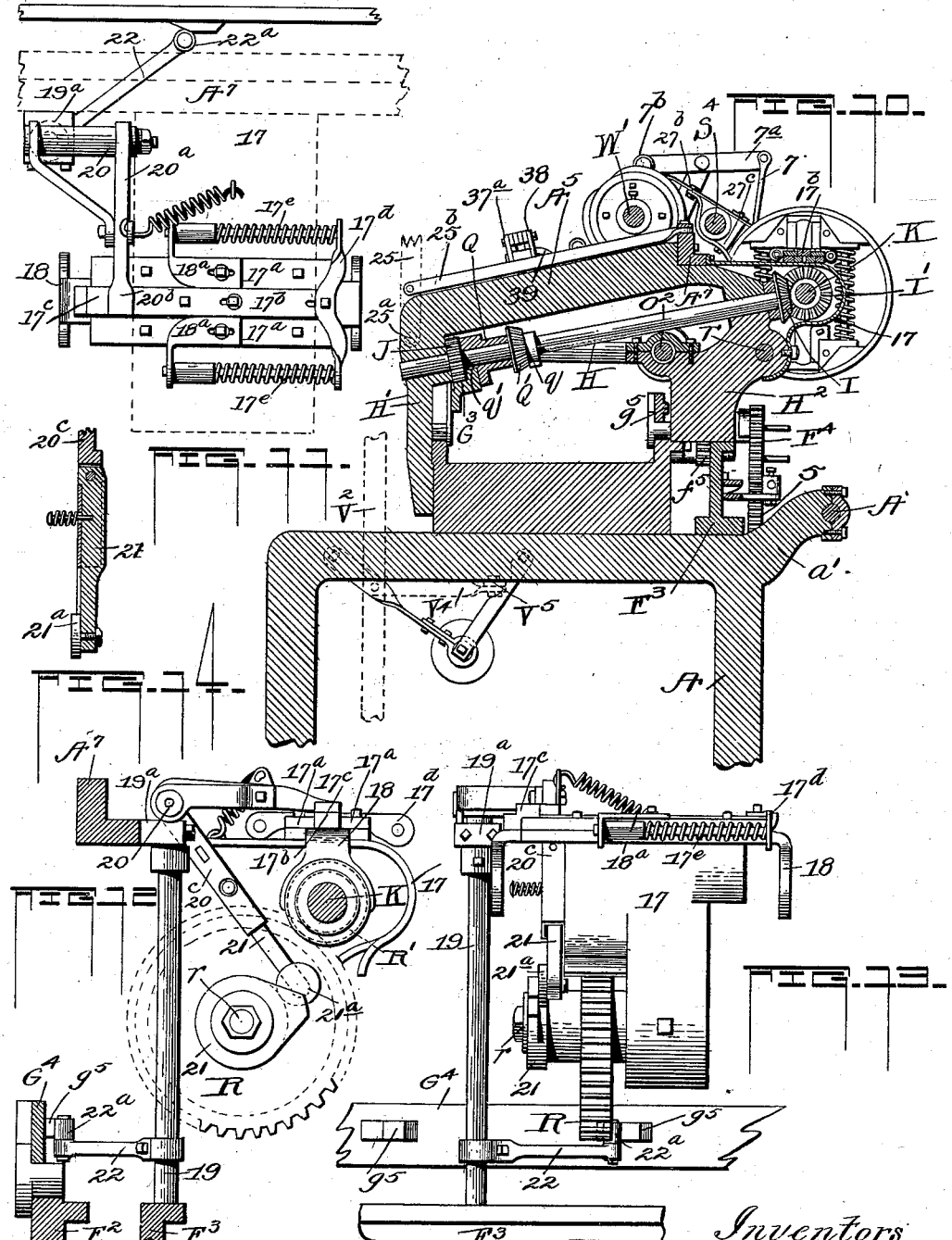

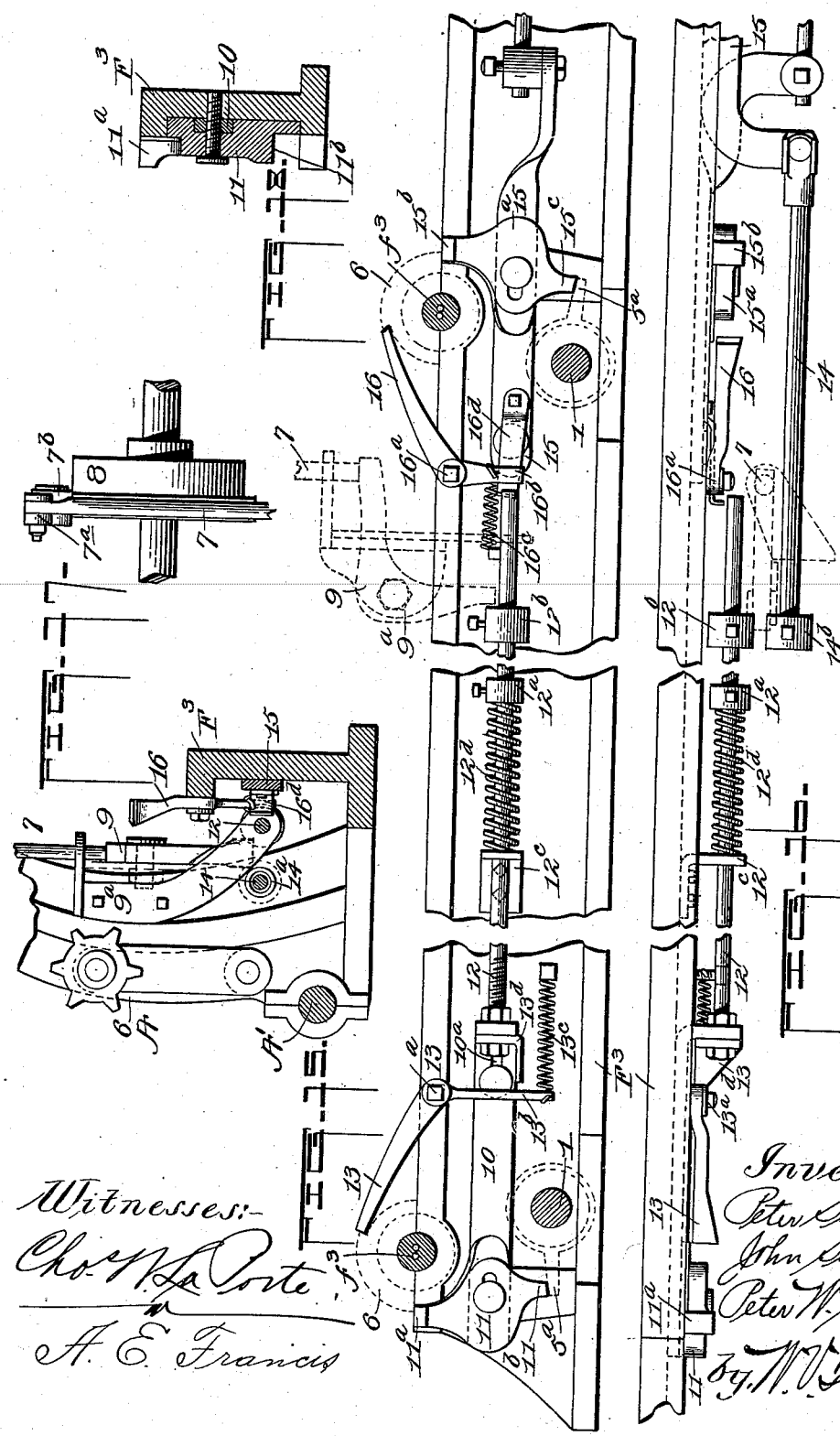

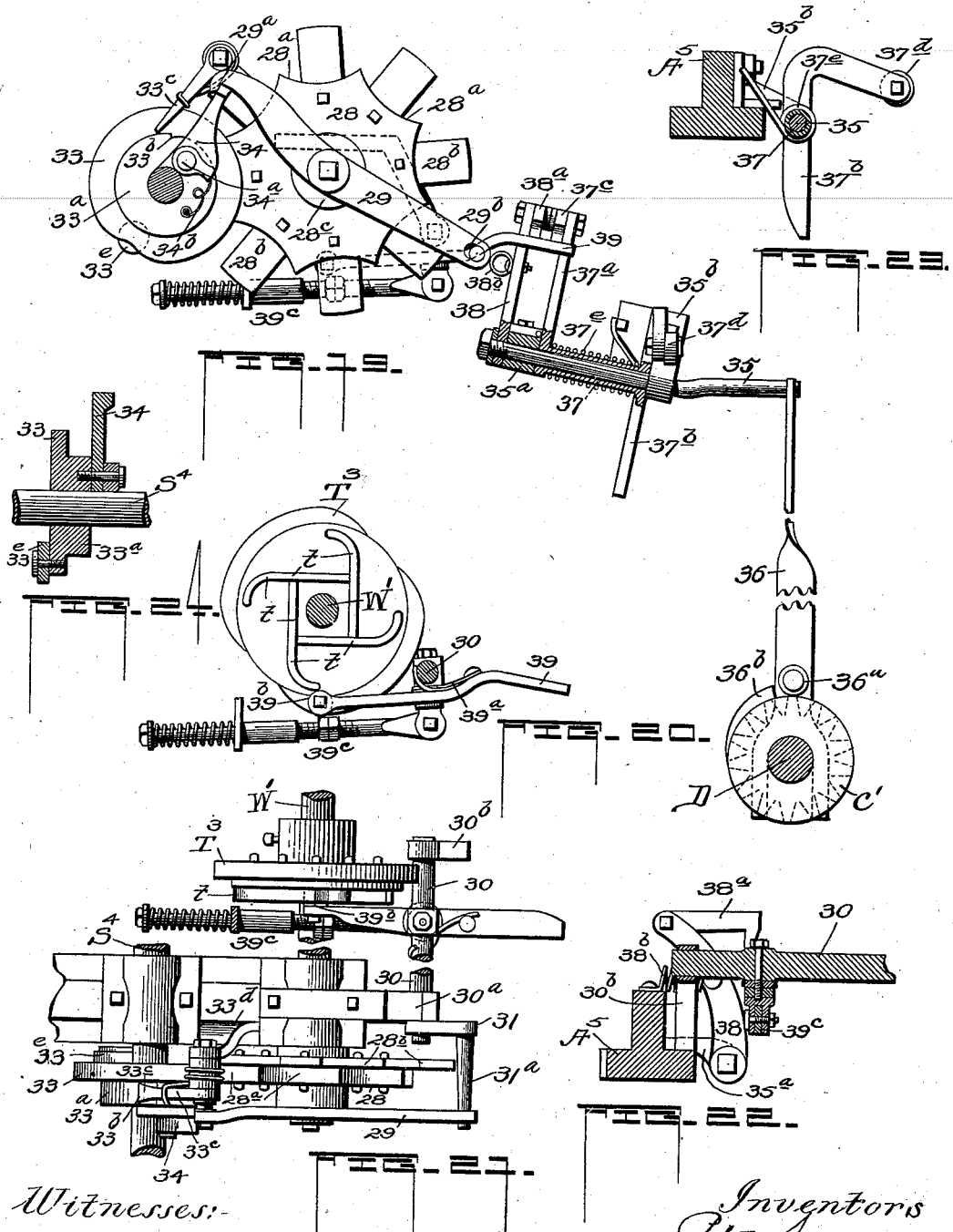

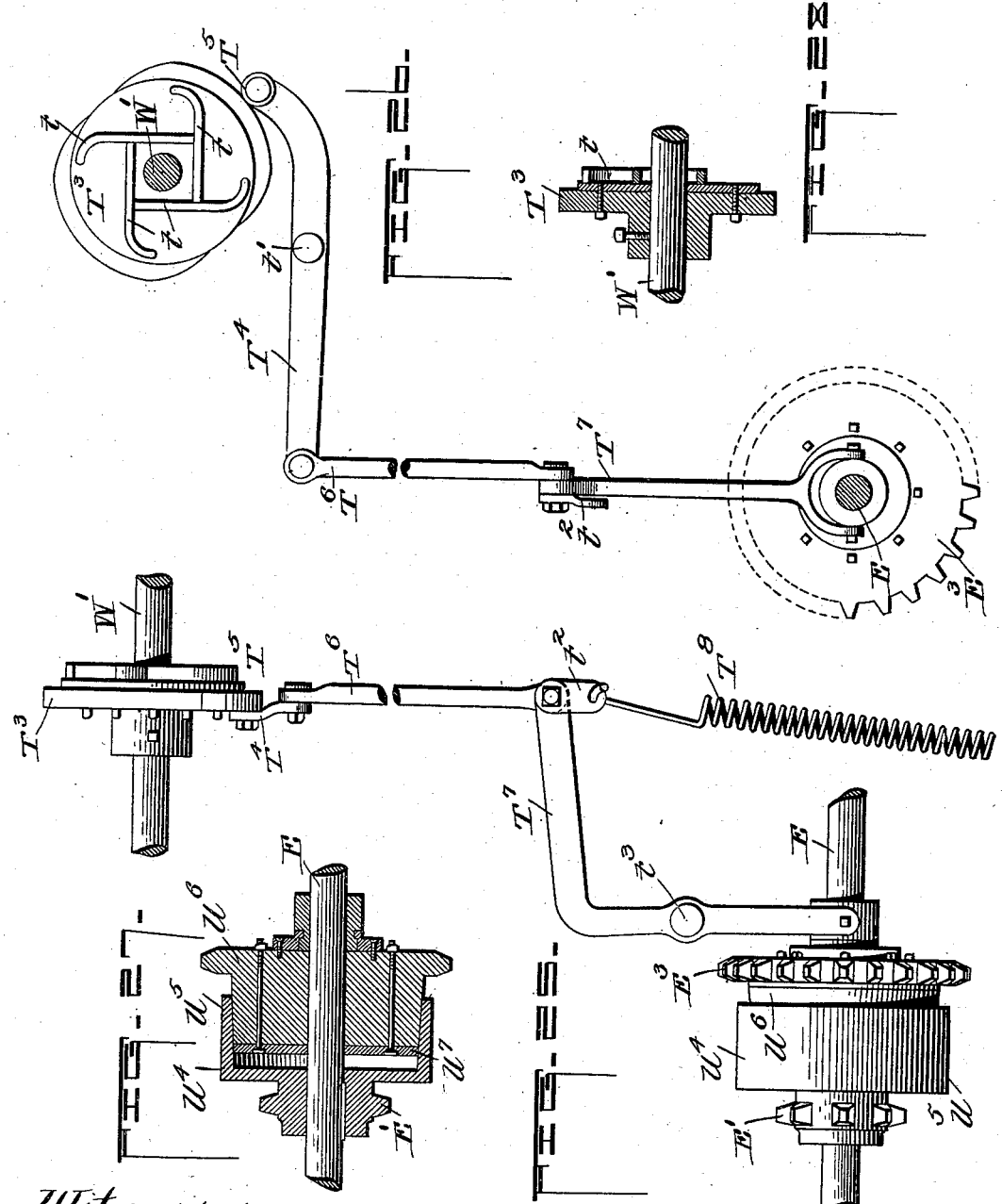

No. 651,785. Patented June 12, 1900.
P., J. & P. W. SOMMER.
WIRE FABRIC MACHINE.
(Application filed Feb. 17, 1899.)
(No Model.) 12 Sheets—Sheet 10.
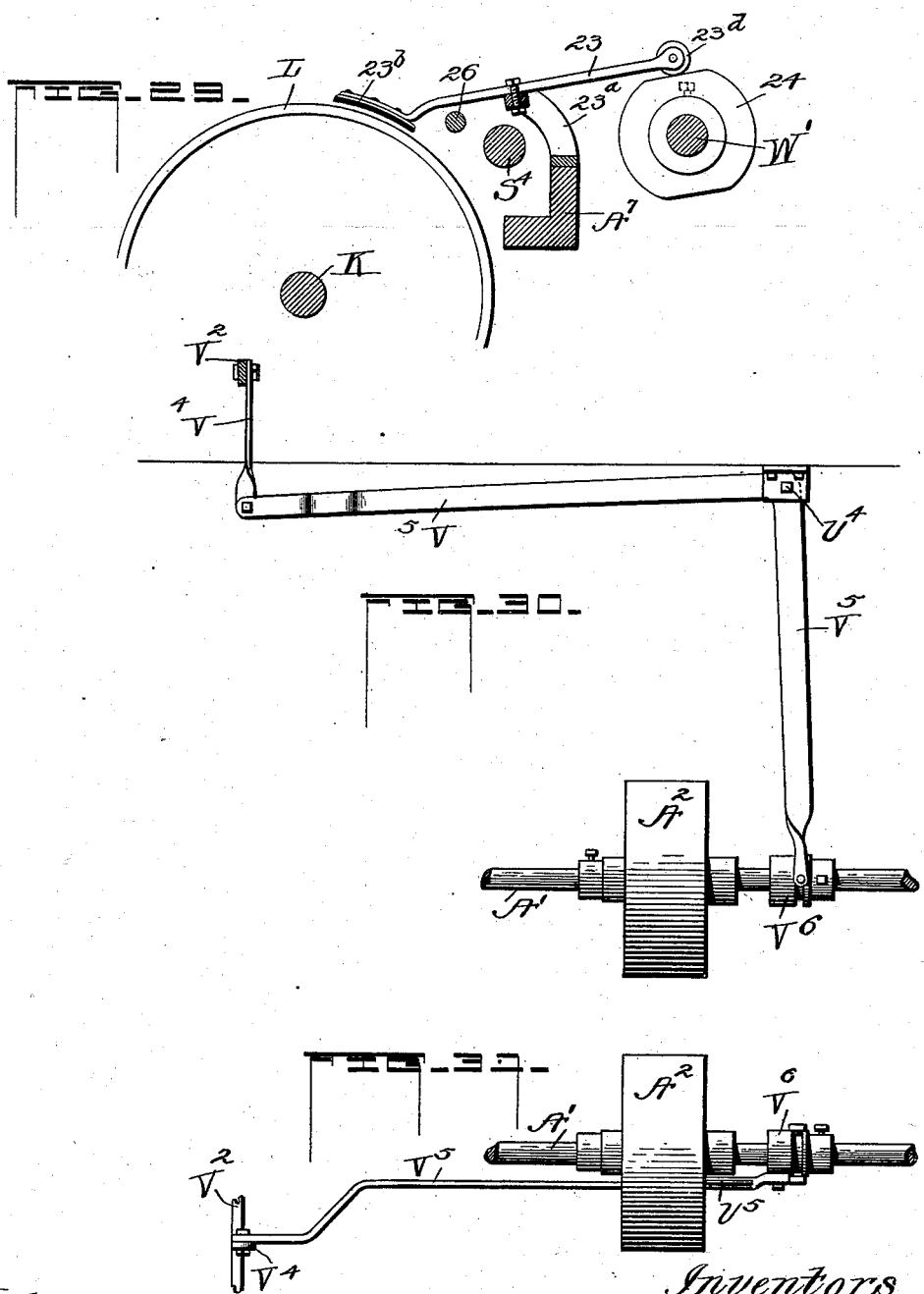

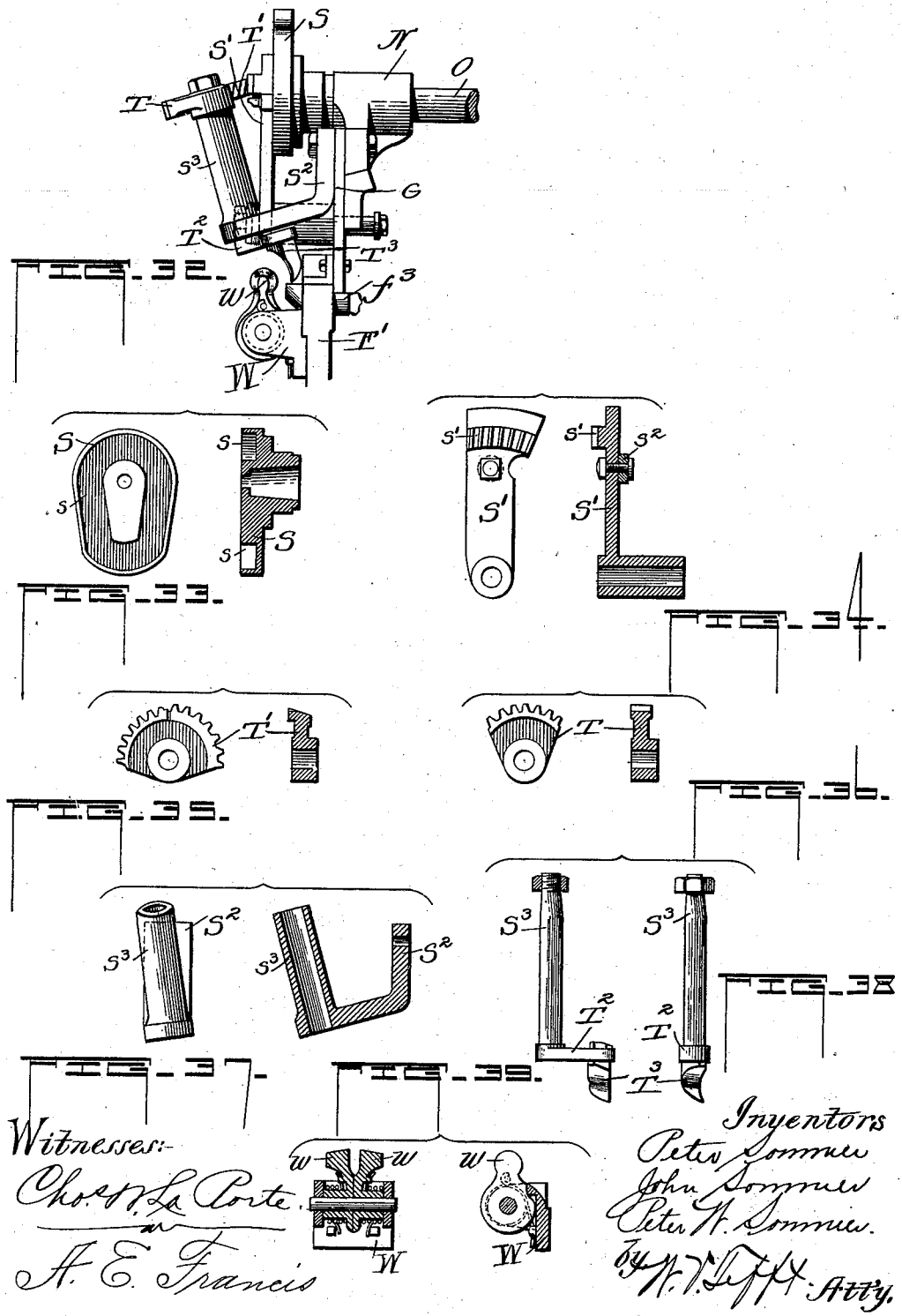

No. 651,785. Patented June 12, 1900.
P., J. & P. W. SOMMER.
WIRE FABRIC MACHINE.
(Application filed Feb. 17, 1899.)
(No Model.) 12 Sheets—Sheet 12.
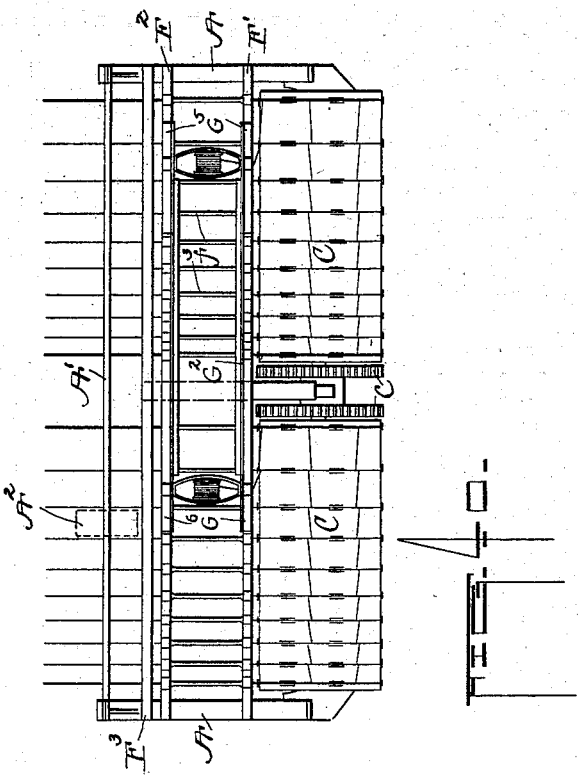

UNITED STATES PATENT OFFICE.

PETER SOMMER, JOHN SOMMER, AND PETER W. SOMMER, OF PEORIA, ILLINOIS.

WIRE-FABRIC MACHINE.

SPECIFICATION forming part of Letters Patent No. 651,785, dated June 12, 1900.

Application filed February 17, 1899. Serial No. 705,818. (No model.)

*To all whom it may concern:*

Be it known that we, PETER SOMMER, JOHN SOMMER, and PETER W. SOMMER, citizens of the United States, residing at Peoria, in the county of Peoria and State of Illinois, have invented certain new and useful Improvements in Wire-Fabric Machines; and we do hereby declare that the following is a full, clear, and exact description of the invention, which will enable others skilled in the art to which it appertains to make and use the same.

Our invention relates to certain new and useful improvements in wire-fabric machines by means of which a machine is provided being wholly automatic in its action and very efficient in its working for the purpose designed.

More particularly, our invention relates to a machine designed to weave or twist together wires into mesh form for the purpose of making the same for practical use as a fence, the said fence being woven in strips of various widths consisting of a number of web-wires or parallel strands and a weft-wire successively twisted upon the several web-wires, which may be termed a "continuous" wire.

Our invention consists, essentially, of a suitable bed-frame upon which is mounted a double series of sections through which the web-wires are carried, each constructed in a manner suitable to have a movable part shifted back and forth thereon; of a movable carriage adapted to travel in a plane parallel with and above the sections, adapted to have placed in the opposite ends thereof a shiftable section provided with spool-journals therein upon which the weft-wires are wound and which are designed, as the carriage is moved back and forth or from side to side, to alternately and simultaneously match with each of the series of sections on either side of the machine to form a spindle and to be revolved together to form the twist of the weft-wires with each of the web-wires of the adjoining series, respectively; suitable corresponding parts at each end of the carriage adapted to coöperate with the half-journals in twisting the weft-wires with the web-wires; means on the front face thereof for drawing out the weft-wires and for holding the same a sufficient length of time for causing a uniform twist throughout of the weft-wire with the web-wire; means for guiding the same from the journals to a revoluble clamp provided with a series of jaws set in rows provided to seize the wires at a proper time in its rotation and to draw them out; means for causing the cable-twisting sections to be operated independently of the means for operating the outer and inner cable-sections of either of the adjoining sections simultaneously; suitable power and connection with such power for causing the said carriage to travel back and forth above said sections, and means for reversing the said operating parts at any time desired by the operator.

Our invention embodies many other details of construction, which are added as supplemental parts materially essential in perfecting the operation of the machine.

That our invention may be more fully understood, reference is had to the accompanying drawings, in which—

Figure 1 is a side elevation of the complete machine, having certain auxiliary parts for delivering the web-wires to the operating parts on the machine. Fig. 2 is a rear view of the working parts centrally located on the machine, also showing one end of the main frame and its component parts, with the other end broken away. Fig. 3 is an end view looking from one side of Fig. 2. Fig. 4 is an end view as viewed from the other side. Fig. 5 is a plan view of the central part of the machine, showing the main operating parts thereof. Fig. 6 is a vertical longitudinal section of one of the outer cable-twisting sections and its coacting parts. Fig. 7 is a front elevation of the parts shown in Fig. 2. Fig. 8 is a plan view of the carriage, and Fig. 9 is a cross-section taken from Fig. 8 at the point indicated by dotted lines. Fig. 10 is a vertical cross-section through the central portion of the machine, showing the parts that operate the carriage and the means for insuring the holding of the carriage until after the twist is made. Figs. 11, 12, 13, and 14 show a plan, a front, and a side elevation and a section, respectively, of component parts of the machine relating to the clutch mechanism for moving the carriage and for twisting the intermediate sections. Figs. 15, 16, 17, and 18 are detail views, enlarged, showing the means for actuating the outer and inner cable-sections of the two adjoining series of sections. Figs. 19, 20, 21, 22, 23, and 24 are detail views, enlarged, of the means for controlling the starting and stopping of the carriage and the clamp and for reversing the same. Figs. 25, 26, 27, and 28 are detail views, enlarged, showing the intermediate connections from the automatic shaft, the clutch-operating parts controlling directly the revolving clamp. Fig. 29 is a detail view, in cross-section, of the automatic brake for controlling the main clutch-operating parts. Figs. 30 and 31 show a plan and an elevation of the means for starting and stopping the machine. Figs. 32, 33, 34, 35, 36, 37, and 38 show an elevation and the detail parts of the mechanism for pulling out the weft-wires. Fig. 39 shows detail views of the guiding mechanism for guiding the web-wires to the clamp. Fig. 40 is a plan view in outline of the forward portion of the machine, showing the carriage and shiftable sections and the product as the same is woven and delivered to the clamp.

In the figures, A A A refer to the main frame or upright supports, which are connected together by suitable cross-pieces $a\ a$, which are provided especially to strengthen the main frame parts, adapting the same to support the various operating parts carried thereon. The frame parts A are provided with the rear extensions $a'$, adapted to support the main shaft $A'$, which is journaled in the ends of the extensions $a'$, as shown, the extensions protruding a sufficient distance to adapt the carrying of the main driving or pulley wheel $A^2$ upon the shaft $A'$, which must of necessity clear the frame parts supported on the uprights A.

B B' are frame parts suitably secured to the upright frame-supports, with suitable working parts carried thereon and actuated simultaneously with the main operating parts on the main frame, the several parts having been shown and described in former applications for patents by applicants comprising the spool-carrying frames for feeding the web-wires and also the reel and reel-tightener, these parts having been illustrated in Fig. 1 with a view of showing an elevation of the entire machine as it appears preparatory to having wires placed therein. A revoluble clamp C is also shown adjusted at the front of the machine, the same being suitably journaled in the boxes $C'$, which are bolted to the frame parts A, the adjustment of the clamp being such that the upper edge thereof is on a line with the perforations in the twister-sections to be described. This clamp may be of any suitable construction; but in the drawings for illustration we have shown a clamp that was patented by applicants and bears patent-number 539,883. The clamps must of necessity be arranged in pairs to meet the requirements of the double-operating sides of the machine; but the parts may be so arranged to operate as that one clamp extending across the entire width of the machine would be sufficient. At the inner end each is provided with the gearing-surface $c$, adapted to match with the gear-wheels or pinions $c'$, mounted upon the shaft D, which is suitably journaled on cross-braces of the main supports A. Upon the outer end of this shaft D we have shown a sprocket $D'$, which receives its power from the pinion $d$ through a suitable chain connection, this pinion being mounted on the short shaft $D^2$. $D^3$ is a sprocket-wheel mounted on the shaft $D^2$, suitably connected, by means of a sprocket-chain, to the pinion $E'$, carried on the shaft E, which is journaled to the rear of the supports A, as shown.

$E^2$ is a sprocket-wheel carried on the shaft $A'$ in the position shown in the drawings and is suitably connected by sprocket-chain to the sprocket-wheel $E^3$ on the shaft E. Through these several connections just above indicated it will be seen that when power is applied to the shaft $A'$ the parts correspondingly connected therewith will be operated simultaneously.

The parts to be described hereinafter are more or less complicated when taken as a whole, and in referring to them for the purpose of convenience we will take up separately the main points or operative parts and describe them fully and will then show their connection the one with the other to perform their several and independent functions and finally connect them with the power-driven shaft $A'$ and then describe the detail operation of the complete device.

Extending transversely across the upright frame-supports A we have shown the bed-frame, upon which is mounted and adapted to travel a movable carriage. This bed-frame consists of the upright side frame-pieces $F'\ F^2$, suitably braced together by cross-braces $f$ and extending from side to side of the machine, the upper edges of each of the pieces being recessed at intervals to form half-journal bearings for the half-journals of sections $f'\ f^2\ f^3\ f^4$ on either side of the main operating parts of the machine, and the said sections when adjusted within the recess of the bed-frame or upper edges of the side pieces thereof are on a line with the upper edges of the said pieces of the bed-frame, thus presenting a smooth and continuous surface upon the edges thereof. $F^3$ is also an upright frame part extending transversely across the frame parts A and which is mounted thereon at the rear of the frame part $F^2$. $F^7$ represents recesses formed in the upper edges of the frame part $F^3$, adapted to have journaled therein the rear portion of the stationary twisting-sections, and $F^5$ represents boxes adapted to hold the same in position, this frame part $F^3$ being adapted to support other frame parts that will hereinafter be described.

Traveling back and forth across the bed-frame and upon the smooth surface of the upper edges of the frame-pieces F' F² we have provided the carriage above referred to, in the opposite ends of which is adapted to be carried a shiftable section which matches successively with the different lower sections $f'$ $f^2$ $f^3$ $f^4$ as the carriage is fed back and forth across the machine. The carriage is composed of the main frame parts G G and G' G', which said frame parts are suitably connected by the cross-braces $g'$ $g'$, adapted to render the carriage substantial. The forward or front sections of the respective ends are connected by means of the bar G², and running lengthwise of and suitably secured thereto is a cogged rack G³, upon which is fastened the bar G⁴, provided with depressions $g^2$ at intervals apart varying in distances the length of the bar.

$g^5$ represents lugs carried on the inner face of the bar G⁴ and projecting at intervals the length thereof or just below the depressions $g^2$ in the inner face thereof.

The lower forward ends of the frame parts G G, which are in the form of shoes, are held in position by suitable means, and in the lower edges of the frame-pieces G⁵, at a point somewhat near their centers, a semicircular depression $g^3$ is provided, within which the respective half-journals of the shiftable sections are carried, this shifting section having been left out of the drawings, as it forms no part of this invention and is fully shown in patent numbered 490,775. The shoes G⁵ being detachable greatly facilitates the easy removal of the shiftable section for the supply of new spools of wire to be carried therein, and the said shoes have the further function of traveling in advance of the carriage to insure the proper adjustment of the lower sections $f'$ $f^2$ $f^3$ $f^4$, that may happen to be turned out of position, so that they will not interfere with the movement of the carriage. Upon these frame parts G G' are mounted various elemental parts necessary in the complete operation of the carriage to perform its several functions, it being necessary, of course, that the said carriage shall be moved and that such movement shall be intermittent and that when the carriage is stopped it shall be always in such position that the shifting sections of the spindles which it carries shall be in coincidence or matched relation with both or either of the lower series of sections while a twist is being made of the continuous wires with both of the matching line wires or cables and that the carriage shall be moved and stopped, that the said shifting section which it carries shall be successively matched and rotated with each and every lower section of the series on either side of the machine, and that the continuous wires may be twisted with the line-wires carried through the several lower sections as the said carriage moves back and forth across the entire machine or the bed-frame thereof, which supports the said lower sections.

By examining Figs. 7, 8, and 9 the detail construction of the carriage may be readily understood; yet there are certain details of construction that will be hereinafter more fully described.

By referring to Fig. 10 in connection with the above figures, H is a short shaft suitably journaled in standards H' H², the standard H' being supported on the frame part F' and the standard H² suitably supported on the frame parts F² F³, the shaft H being arranged transversely across the path of the moving carriage and provided with the bevel-pinion I on its inner end, which said pinion meshes with the bevel-pinion I', suitably carried on shaft K, which is supported at right angles with the shaft H and somewhat above the main shaft A'. Upon the outer end of the shaft H is provided the gear-wheel J, suitably arranged and meshing with the toothed rack G³ of the carriage, the shaft H being actuated through the meshing of the bevel-pinion I with that of the pinion I' on the shaft K, the shaft K receiving its motive power from the shaft A' in a manner to be described.

The twisting mechanism above referred to, consisting of the upper sections, which have been described and which will be referred to as the "shifting" sections, and which are held in place in the traveling carriage, and the lower sections $f'$ $f^2$ $f^3$ $f^4$, these being provided the one carriage with the double twisting-sections carried at each end thereof, while there are employed a series of lower stationary sections—that is, stationary with reference to the framework, but revoluble with the shifting sections in the carriage—the particular formation of the respective parts of these spindles, the manner of carrying the same with relation to the bed-frame, and the general arrangements of the coacting parts being the same as those shown and described in our application for patent bearing Serial No. 499,016; but for convenience and to aid in a full and clear understanding of the working of these parts in connection with the operation of the carriage we will describe the detail parts and hereinafter describe them in operation with the entire machine.

In Fig. 6 the particular manner of carrying the intermediate sections will be seen, although the section shown in the figure is taken through the outside one of the series of the cable-sections, the figure showing the particular form of the lower section, showing the same bowed at its central portion and provided at its forward end with a half-journal, and the rear portion adjacent to the bowed part of the said section is also formed with a half-journal, the upper portion of the complete journal being cut away, while the extreme rear end of the said section is round and is provided with a gear-wheel $f^5$, made integral therewith, there being one provided upon the rear extremity of each of the respective intermediate sections, these intermediate sections being also provided, as shown, with perforations, one in the rear end of the section and one in the forward half-journal thereof, the wire carried in the said section passing first through the perforation in the rear end of the section, then underneath in a suitable groove in the bowed part of the section, and, finally, out through the perforation in the forward end or half-journal thereof. The formation of the outside sections are only different in that there are two perforations in the respective ends of the sections instead of one and the rear portion of which extends rearwardly a little farther, a sufficient distance beyond the frame part $F^3$ to provide for the carrying of the gear-wheel $F^4$ on the end thereof.

As previously explained in this specification, the sections $f'$ $f^2$ $f^3$ $f^4$ are arranged on a bed-frame on which there are two separate series, although the two series constitute the one bed-frame, each series provided with the cable-sections at either end thereof, the several sections in the duplicate series being adjusted at intervals either regular or graduated, according to the width of mesh desired in making different styles of wire-fence fabric, and the shiftable sections are journaled within a shifting carriage and are carried therewith, which are designed to be moved back and forth across the plane of the strand-wires and upon the bed-frame, each shifting section having a matching relation successively with the respective lower sections or the half-journals thereof of each of the lower sections in the two series and adapted to be rotated with the respective sections successively as the half-journals of each are in coincident relation for the purpose of twisting the continuous wires with the line-wires at the intersecting points. The manner of operating the intermediate and stationary sections of each of the series and the manner of actuating the outer or cable sections alternately at the same time are independent means and will be described separately and thereafter with relation to the working of the entire machine.

Referring to shaft K, which is suitably journaled in the standards $A^6$ $A^6$, L L' are clutch-frames, revoluble with and suitably secured to the shaft K, each of which is provided with the clutch-operating parts L' $L^2$ $L^3$ $L^4$, which directly or indirectly assist in the moving of the carriage back and forth across the bed-frame and for twisting the intermediate strands with that of the weft or continuous wire on the carriage, the shaft K receiving its power through two sources, as is necessary in the operation of the parts connected therewith.

$k$ is a pinion loosely mounted on the sleeve $k'$, which has the clutch L', and which said pinion is always in motion through the chain connection and the pinion $k^2$, secured on shaft A'.

M is a gear-wheel mounted on the sleeve $m'$, upon which is the clutch $L^3$. The pinion M is suitably mounted to mesh with the intermediate gear-wheel M', which is mounted on a short shaft journaled in the standard $A^6$ and which also carries the pinion $M^2$, which through a chain connection is actuated by the pinion $M^3$ on the shaft A'. Suitably carried on the shaft K is mounted the bevel-pinion I', meshing with the pinion I, suitably carried on the shaft H, at the forward end of which is mounted the gear-wheel J, which meshes with and actuates the carriage through the toothed rack $G^8$.

The carriage is provided with the standards N N' $N^2$ $N^3$, the standards N N' supporting the cross-shaft O, the standards $N^2$ $N^3$ supporting the shaft O', and the standards $N^2$ $N^3$ also provided to support the transverse shaft $O^2$, running lengthwise of the carriage-frame.

P is a gear-wheel connected by a spline-and-groove connection with the shaft $O^2$, adapting the wheel to be turned therewith and at the same time to allow a free and easy movement of the shaft therein as the carriage is moved back and forth across the bed-frame. P' is a gear-wheel suitably mounted on the short shaft $P^2$, journaled in the support $A^4$, which is secured to the frame part $A^5$. The said wheel P' meshes with the wheel P on the carriage-shaft $P^2$. The shaft P also supports the partially-toothed bevel-gear $P^3$, which is turned simultaneously with the gear-wheel P'. This partially-toothed bevel-gear $P^3$ has the recess $p$ in the front face thereof. At the forward end of the shaft H is carried the sleeve Q, to which is fast the bevel-pinion Q', adapted to mesh with the teeth of the bevel-gear $P^3$. That part of the sleeve Q carried rearward of the pinion Q' on shaft H is provided with the lug projection $q$, adapted when the bevel-gear $P^3$ is turned to contact with the recess $p$, and thereby hold the same for contact by the pinion Q' until the sleeve Q is turned the required distance. That portion of the sleeve Q extending forward of the pinion Q' has a portion which is flattened, as at $q'$. This flat portion is provided to adapt the upper face of the bar $G^4$ to pass beneath as the same is in operation and the carriage is being moved forward or backward preparatory to making the next twist and when the sleeve is stationary upon the shaft H; but when the carriage has gone sufficient distance and the moving sections are in position to twist with the sections on the bed-frame and to secure the right adjustment of the carriage parts and to hold the same while in operation, the rounded portion of the sleeve Q, having been turned by the actuation of the pinion Q', will drop into the recess $q^2$, that is in a position to be contacted therewith, and will hold the same, as just above described. The gear-wheel P receives its power through the intermediate gear-wheel R, which is mounted on the short shaft $r$ and which derives its power from the gear-wheel R', mounted on the sleeve $r'$ upon the shaft K.

At either end of the carriage and supported upon the frame parts G G' and upon the shafts O O' we have provided a means for drawing the weft-wire out of the shifting sections and to hold the same a sufficient length of time to insure the twist of the weft-wires with the strand-wires to be uniform throughout.

S represents cams having the formation shown in the drawings and which are suitably secured to the outer ends of the shafts O O', the cams being provided with the continuously-formed grooves $s$ in their outer faces.

S' represents arm extensions from a suitable sleeve-support on the frame parts G G', the upper front faces of which are provided with the toothed rack $s'$. Suitably journaled on the back of the arm extension are rollers $s'$, adapted to match with and travel in the grooves $s$ when the same are properly adjusted. $S^2$ represents arms also supported on the frame parts G and G', and $s^3$ are sleeve extensions therefrom, these arms being arranged in pairs at either end of the carriage and purposed to support the spindles $S^3$, upon the upper end of which are carried the sectional cog-wheels T and T', suitably carried to mesh with the toothed rack $s'$ on the arms S'. The spindles at their lower ends are provided with the arm extension $T^2$, to which are secured the dogs $T^3$, having the formation shown in Fig. 38, the parts just above described being best shown in Figs. 32 to 38, inclusive. In the operation of these parts and that of the twisters, U U' are bevel gear-wheels carried at either end of the carriage and upon the longitudinal shaft $O^2$, which wheels mesh with the bevel gear-wheels $U^2$ $U^3$ on the cross-shafts O O', the shafts each carrying at their rear ends the partially-toothed gear-wheels V V', upon the front faces of which are provided the semicircular contacting plates $v\,v'$, provided, when the same are rotated, to contact with the lugs $f^6$ on the rear of the gear-wheels $f^5$ on the intermediate sections $f'\,f^2$ to insure a complete engagement of the wheels V V' with those of the sections $f'\,f^2$.

Below the point of delivery of the strand-wires to the clamping device described we have shown a guiding device, insuring a safe delivery of and guiding the strand-wires to their proper place upon the clamp. This device consists of the bed-plates W, securely fastened to the bed-frame plate F', and upon which said plates W are journaled and held under tension the arms or lugs $w$, the arrangement and detail of these parts being clearly seen by examining Figs. 7 and 39.

The outer twisting-sections, or what are termed the "cable-sections," as above described, are a little different in construction from those described as the intermediate sections and are operated from an entirely-different source to that which actuates the intermediate sections, and the inner cable-strands of either of the series, by an arrangement shown, are simultaneously and conjointly actuated with that of the outer cable-strands of the adjoining series.

Referring to Figs. 2 and 15 to 18, inclusive, corresponding letters and numerals indicate the parts that go to assist in the twisting of the cable-strands. Upon the outer ends of the cable-sections are carried the gear-wheels $F^4$, heretofore described. Suitably supported upon spindles 1, that are carried on the frame part $F^3$, we have shown a clutch 2, which consists of the part that carries the bevel-gear 3, which derives its power from the matching bevel-pinion 4, suitably carried on the main shaft A' and revoluble therewith. The clutch is so constructed and operated that the part carrying the bevel gear-wheel 3 is continuously operated through the gearing provided on the shaft A', the rear part of the clutch, which is held under tension by a suitable spring and which is provided with the gear-wheel 5, matching the gear-wheel $F^4$ on the section. That portion of the clutch which carries the wheel 5 is also provided with the extension $5^a$, which contacts with means, to be described, which when said pressure is released allows the clutch-section which is held under tension to be engaged with the section carrying the bevel-gear 3 and which is continuously in mesh with the pinion 4 on the main shaft, causing the said cable-section to be revolved. The said sections are each provided with the cam 6, suitably arranged to be contacted with by a finger that will be described, which operates conjointly with the means that controls the clutch-engaging mechanism just described, and which said arrangement controls the operation of the cable-twisting devices and so timed in their movements as to cause the starting and stopping of the cable-twisting sections at the proper time.

We will now describe the parts which materially affect the cable-twisting sections and component parts and will describe only one of the two sets of parts which operate the outer cable-section of one series and the inner cable-section of the adjoining series.

7 is a rod vertically carried with relation to the main bed-frame and which is secured to the bar $7^a$, which has journaled thereto the roller $7^b$, which contacts with the cam 8, which is timed in its operation with relation to the other working parts of the machine so as to cause the rod 7 to be operated at such a time as is necessary for the twisting of the cable-sections. The bar $7^a$ is pivoted at $7^c$ to the bar $7^d$, which is suitably secured to the frame part $A^6$, there being two such supports—one on either side of the center of the machine. The rod 7 extends down and is purposed to contact with one end of the angle-frame part or dog 9, which is pivotally secured to the frame $9^a$, which said frame is suitably secured to the frame part $A^6$.

10 is a bar suitably carried on the outer ends of the frame part $F^3$, each slotted as at $10^a$, adapting the same to slide back and forth. At the extreme outer ends of the bars 10 are carried the lugs 11, which have the upper and lower square-ended portions $11^a$ $11^b$ adapted for contact, the portion $11^a$ with the irregular face of the cam 6 on the cable-twisting section and the portion $11^b$ with the extension $5^a$ of the clutch. 12 is a rod firmly secured to the bar 10, and $12^a$ $12^b$ are collars adjustably secured on the bar 12.

$12^c$ is an angle-brace attached to the frame part $F^3$, through which brace the rod 12 extends.

$12^d$ is a coiled spring carried on the rod 12 and which bears between the angle-brace $12^c$ and the collar $12^a$, holding the rod 12 and the bar 10 always under a strong tension, and the rod 12 is carried in such a relation to the angle-frame or dog 9 that the lower end thereof will contact with the collar $12^b$ on the rod 12.

13 is a finger suitably pivoted at $13^a$ to the frame part $F^3$, and $13^b$ is an arm extension held under tension by means of the spring $13^c$, suitably secured to the end thereof and to the frame part $F^3$. The finger 13 is so carried with relation to the cam 6 on the cable-section as to contact and bear against the irregular face thereof.

$13^d$ is a lug extending from the bar 10 and adapted, when the bar 10 is moved, to contact with the arm extension $13^b$, which will cause the finger to be disengaged from the cam 6. This bearing of the finger 13 and the upper portion $11^a$ of the lug 11 on the bar 10 against the irregular face of the cam 6 insures a quick release and stop for the cable-twister sections, which is provided for the purpose of allowing the sections to be turned just a certain number of times and then stopped, and the releasing, as well as the stopping, of these parts must be quick and accurate.

When the bar 7 is forced against the upper end of the angle part 9 by reason of the contact by the cam 8 on the roller $7^b$, which is suitably contacted to the rod 7, the lower end of the angle will contact with the collar $12^b$, causing the rod 12 and the bar 10 to be moved, which will cause the upper and lower parts of the cam 11 to be disengaged from the cam 6 and the extension $5^a$ from the clutch 2, which will bring the two parts of the clutch together, causing the operation of the matching gears $F^4$ and 5, which actuate the cable-twisting sections. At the same time of the moving of the bar 10 the lug $13^d$ thereon will contact with the arm extension $13^b$, causing the moving of the parts connected therewith, as above described. The cam 8 in its operation will release the bar 7 from the contact just described, which will free the parts under pressure connected therewith and will cause them to drop back into their normal positions by reason of the parts being held under tension, which will cause the parts to be held in a stationary position, as just previously described.

14 is a rod similar to the rod 12 and is suitably supported in the manner shown and is provided for the purpose of actuating the parts connected with the inner cable-twisting sections of the adjoining series, the rod 14, held under tension by the spring $14^a$, abutting against the standard $A^6$ and the collar $14^b$, the collar $14^b$ having a bearing relation with the lower end of the angle-lug 9, which when operated as above described will actuate the rod 14, the rod being suitably connected to the bar 15, which carries the lug $15^a$, which is provided with the upper and lower contacting ends $15^b$ $15^c$, adapted to contact with the cam 6 and the projection $5^a$ on the rear portion of the clutch, which said lug when actuated operates upon the above said parts substantially the same as that described for operating the outer section just described.

16 is a finger pivoted at $16^a$ to the frame $F^3$, and $16^b$ is an arm extension held under tension by the spring $16^c$, which said arm is actuated by contact from the lug $16^d$ on the bar 15, the finger 16 contacting with the irregular face of the cam 6 and adapted to operate them substantially the same as the finger 13 on the outer section just above described.

The parts just above described will be readily understood, reference being had to Figs. 2 and 15 to 18, inclusive. It will be seen by arranging the parts as shown that the manner of operating the cable-sections is very simple, as well as effective, and in arranging the parts to operate substantially as shown when the carriage has reached the point when the cable-sections must be operated the outer and inner cable-sections of either of the adjoining series will be operated simultaneously. The means for causing the operation of the rod 7, which has a contacting means with the cam 8 on the shaft, will be hereinafter more particularly described.

The manner of automatically shifting the clutch-sleeves $L^2$ $L^3$ to engage with the frames L L', adapting the carriage to be moved forward in either direction or stopped and the shifting sections on the carriage twisted with the matching twister-sections carried on the bed-frame, is described as follows:

17 is a frame-plate suitably supported on the frame $A^7$ and adapted to support the operating parts controlling the clutch-sleeve $L^2$ $L^3$.

$17^a$ $17^a$ are plates suitably secured to the frame-plate 17, which said plates together form a groove or guideway through which are carried and purposed to slide the clutch-operating bar 18, to which said bar is secured the bar $17^b$, which is provided at one end with the lug projection $17^c$. The clutch-operating bar 18 is held under tension of the springs $17^e$, which are carried between the extensions on the plates $18^a$, which are bolted to the plates $17^b$, and the cross-brace $17^d$, which is bolted to the bar $17^b$.

19 is a vertically-carried rod suitably journaled at its lower end in the plate $F^3$ and at the upper end in the supporting-plate $19^a$, bolted to the frame $A^7$.

20 is a sleeve projection suitably secured to the rod 19, adapting the same to be moved conjointly therewith. The sleeve 20 carries a rod which has suitably connected therewith the angular bar $20^a$, having the upper and lower arm extensions $20^b$ $20^c$, the extension $20^b$ abutting against the lug $17^c$ on the bar $17^b$. The lower end of the bar $20^a$ or the arm extension $20^c$ is suitably slotted and carries therein the bar 21, which is provided with the roller $21^a$.

22 is a bar or rod extension which is suitably secured to the vertically-carried bar 19 and upon the outer end of which is mounted the roller $22^a$, adapted to be contacted with by the lugs $g^5$, carried on the bar $G^4$ of the carriage as the carriage moves back and forth across the bed-frame.

The arrangement of the parts as described adapts the arm extension $20^b$ $20^c$ to be moved laterally and also vertically, both of which said movements are automatic, as shown, and the bar $20^a$ is held under spring tension in its lateral movement by means of the coiled spring $22^b$, suitably fastened to the frame-plate 17 and to a lug projection provided on the arm extension $20^b$.

By referring to Figs. 10 to 14, inclusive, the arrangement and operation of the abovesaid parts will be readily understood, the parts being shown in a position when in the movement of the carriage the clutch $L^2$ will be thrown in operation, which will cause the shifting sections of the carriage to meet and to be operated with any pair of matching lower sections that are at the time coincident with the sections upon the carriage.

In the movement of the carriage the lug $g^5$ on the bar $G^4$ will contact with the roller $22^a$, secured to the bar 22, which through its connection with the vertically-carried rod 19 will swing the arm $20^a$, and the swinging thereof will cause the outer end $20^b$ thereof to engage with the lug $17^c$ on the bar $17^b$ and force the same forward, which will release the carriage-moving clutch $L^3$ and cause the clutch-sleeve $L^2$ to be operated, which will actuate the gear-wheel $I'$ and through its intermediate connection, as heretofore described, hold the carriage while the twisting operation is going on, and as the intermediate gear $R$ is being revolved the cam 21, which is journaled to the shaft $r$, will contact with the roller $21^a$ on the bar extension 21 and will raise the arm $20^a$, freeing the clutch-arm $17^b$, and the same being held under strong spring-pressure will reverse the movement of the clutch and cause the sleeve $L^3$ to contact with the clutch-frame $L'$, which will move the carriage forward, bringing the twisting-sections to the next adjoining one of the series of sections on the bed-frame. At the same time as the carriage is moved the roller $22^a$ will be released from the lug $9^b$ on the carriage, which will free the arm $20^a$. This will drop it back again to the position as shown in the figures above referred to.

Referring to the parts just described it will be noticed that for the successful operation of the parts they must necessarily be timed in their operation, which is accomplished through the shaft K, supporting the clutch-operating parts and its intermediate connections with the carriage, the object of which is to cause the actuation of one clutch when it is purposed to shift the carriage, and when it has traversed to a point when it is desired to twist the section the clutch will be automatically reversed, throwing into gear the parts which will hold the carriage and cause the twister-sections to be operated, all of which said movements will be clearly understood, reference being had to the figures above referred to. The abovesaid mechanism will be further pointed out, and its operation with the entire machine will hereinafter be referred to in describing the machine as a whole.

The operation of the clamp by which and over which the wire fence is carried as the same is woven and after the same has left the twister-sections is intermittent and is actuated after each of the successive twists is made as the weft-wire is carried forward and backward on the machine—that is, after the carriage has traversed the length of the bed in either direction and the cable-sections have finished their twist. Then it is that the cam is operated and the wire pulled out and the parts again adjusted for the next succeeding sets of twists.

$s^4$ is a shaft journaled at $s^4$ $s^4$ in the standards $A^6$, suitably supported on the frame parts $A^8$, which are bolted on the bottom of the bed-frame, the shaft being provided with the sprocket-wheel $s^5$, carried on the outer end of one end thereof, and is connected by sprocket-chain connection with the power-shaft $A'$ through the pinion $s^6$, carried thereon.

$s^5$ $s^5$ are idlers suitably carried on the frame part $A^6$ and over which the sprocket-chain $s^6$ is carried, adapting the same to be removed from any of the working parts of the carriage as the same is moved back and forth.

$T^3$ is a cam-wheel carried on the shaft $W'$ and provided with the irregular bearing-surface, as shown, the face of the said cam being provided with the laterally-projecting straps $t$ $t$ $t$ $t$, whose functions will be hereinafter more particularly referred to.

$T^4$ is an arm pivoted at $t'$ to the frame $t^4$, one end of the arm $T^4$ being curved upward, as shown, and having attached thereto the roller $T^5$, which has a bearing relation with the irregular surface of the cam $T^3$. The outer end of the arm $T^4$ has pivoted thereto the downwardly-extending arm $T^6$, which is suitably attached to the clutch-regulating arm $T^7$. Suitably secured to the point of meeting of the two arms $T^6$ and $T^7$ is a lug $t^2$, which is connected with the spring $T^8$, the other end of the spring being secured to the frame part $a$, the spring $T^8$ being purposed to hold the arms $T^6$ and $T^7$ under a strong tension, for a purpose to be described.

$U^4$ is a wedge-clutch comprising the parts $U^5$ $U^6$, the part $U^5$ having the wedge-shaped recess, as shown, and the reduced rear portion of which part U⁵ is provided with the sprocket-teeth heretofore described as the pinion E'. The part U⁶ of the clutch is wedge-shaped, adapted to engage with the recess of the part U⁵, the clutch-contacting side provided with the packing-ring U⁷ and the other end provided with the sprocket-teeth heretofore described as the sprocket-wheel E³. Upon the outer face of the wedge U⁶ is shown suitably secured thereto the clutch-operating arm T⁷, which said arm is pivoted at t³ to the lug extension t⁴ from the frame part A. To operate the clutch U⁴, which controls the intermediate gearing between shaft E and the clamp C, and which said movement will alternately stop and start the clamp, the movements of the several parts are described as follows: The shaft A' being in motion, the gearing provided through the pinion S⁶ and the chain connection to the pinion S⁷ on the shaft S⁴ and the sprocket-chain connection from the sprocket-wheel E³ will simultaneously actuate the shafts S⁴ and E, when the movements of the parts to be described are actuated through the cam connection T³ on shaft S⁴, which will terminate in the revolving of the clamp C, previously described. The cam T³ is timed in its operation and is timed, as previously described, relatively to the twister-sections, or immediately after the sections have made their twist. The shaft W', upon which the cam T³ is mounted and which controls the movement of the same, receives its power directly through intermediate connections to be described from the shaft S⁴. The arms T⁶ T⁷, being held under tension by means of the spring T⁸, unless prevented would cause the part U⁶ of the clutch U⁴ to be in contact with the part U⁵ of the clutch which causes the clamp to rotate; but in the position of the cam T³ as shown in Fig. 26 it will be seen that the cam has caused the parts of the clutch to disengage, causing the clamp C to be at rest, while the other working parts of the machine, as described, cause the twister-sections to be matched and the twists to be made.

In the operation of the cam T³, as shown in Fig. 26, when the bulging face of the cam moves away from the roller T⁵, the other end of the bar being held under tension, as described, it will be drawn down by means of the connection with the bar T⁶, and at the same time the clutch-operating arm T⁷, which is also held by the same tension and connected to the bar T⁶, will cause the part U⁶ of the clutch to engage the wedge-recess of the part U⁵, which, being keyed to the shaft E, will cause the shaft to be rotated simultaneously, and through the connection of the pinion E', the sprocket D³, the pinion d, the sprocket D', the pinion C', and the gearing c on the cam C will cause the same to be rotated.

We have shown a means which through a suitable lever and connections will reverse the movements of the clutch-sleeves L⁴ L⁵, which automatically shift the carriage in the opposite directions across the bed-frame, the reversing movement of these clutch-operating parts greatly facilitating in the perfect operation of the machine.

25 is a lever vertically carried with relation to the frame parts and pivoted at 25ᵃ to the centrally-located cross-frame A⁵, and pivoted to said lever is the laterally-extending rod or bar 25ᵇ, which extends across the bed-frame, as shown in the figures, and has suitably pivoted thereto the bar 25ᶜ, which is pivoted to the frame A⁷ at 25ᵈ.

25ᵉ is a rod or bar which is also pivoted at 25ᵈ and to the bar 25ᶜ, and this bar 25ᵉ is suitably connected to the rod 26, being suitably secured to the clutch-operating levers 27 27ᵃ, which have their pivotal centers arranged at 27ᵇ on the straps 27ᶜ, which are suitably carried on the shafts S⁴.

In the operation of the machine the levers 27 27ᵃ are automatically operated for the purpose of reversing the carriage when it has traveled the length of the bed-frame in either direction, the same being operated by suitable cams, which are carried on the shaft W', which said shaft is timed in its operation, as before described, and is operated through intermediate means from the shaft S⁴. The operation of these parts and the means for causing the same to be operated from the mechanism suitably carried on the movable carriage will be described.

It is necessary in the operation of the clutch-frames L L' by means of their several clutch-operating parts above described to provide a suitable brake which shall be automatically operated and which will contact with the surface of one of the clutch-frames, it being adapted to operate upon one of the clutch-frames when in the movement of parts hereinbefore described the clutch-operating parts will be reversed, a brake provided which will insure a complete reversing of the parts which are being operated, so that in the operation of the lower twister-sections and of the moving carriage the two movements will not interfere the one with the other.

23 is a brake-arm suitably pivoted to the frame 23ᵃ, which extends up from and is supported upon the frame part A⁷, the brake-arm 23 being provided with the bearing-plate 23ᵇ, the arm 23 being held under tension by means of the spring 23ᶜ.

23ᵈ is a roller journaled, as shown, in the end of the arm 23, the roller adapted to be contacted with by the cam 24, which is carried on and revoluble with the shaft W', as before described. The shaft W' is actuated and also timed in its operation through and by means of connections suitably connected therewith and will cause the brake to operate upon the clutch-frame L in the manner and for the purpose described, the parts referred to being best shown in Figs. 5 and 29 of the drawings.

The pulley-wheel A², which is mounted on the main driven shaft A', is provided internally with a wedge-clutch and is adapted through certain connections to be thrown in gear by the operator from means provided in the front of the machine within easy reach of the operator.

$V^2$ is a lever which assumes an upright position on the machine and which is located centrally thereon or which projects upward between the two revolving clamps, as shown, and which is pivoted at its lower end to the arm $V^3$, extending out from the brace-plate $a$. Centrally located on the lever $V^2$ is attached the arm $V^4$, which has pivotally secured thereto the angle-arm $V^5$, which extends a portion of the length of the machine and then across and is suitably secured to the clutch-ring $V^6$, which is adapted to slide on the shaft $A'$, and by contact with the lug projection $v^5$ from the wedge-clutch, which is revoluble with the shaft $A'$, will cause the same to contact with the outer rim of what is called the "pulley-wheel" $A^2$, causing the several parts connected directly or indirectly with the shaft $A'$ to be operated. The arm $V^5$ is suitably pivoted at $v^4$ to the frame projection, which is suitably secured to the frame-parts of the machine.

The operation of the above said parts and their connection with the pulley-wheel $A^2$ will be readily understood, reference being had to Figs. 1, 30, and 31.

The automatic shaft is operated through parts suitably carried on the outer end thereof, which are actuated from suitable mechanism carried on the shaft $S^4$, the shaft $S^4$, as previously described, receiving its power direct from the main driven shaft $A'$ through the sprocket-chain which is carried over the pinions $S^5$ $S^6$.

The parts controlling the automatic shaft $W'$, the connection between said shaft and the shaft $S^4$, with that of the connection between the carriage and the automatic shaft, and the mechanism coacting with the parts controlling the operation of the revolving clamp will now be described.

On the outer end of the automatic shaft $W'$ is carried the octagon-shaped disk 28, provided with the curved faces $28^a$ around its periphery, and $28^b$ are radial arms extending out from the rear face of the disk 28. From the face of the disk extends the hub portion $28^c$, serving as a bearing-surface for the pivoted arm 29, carried on the shaft $W'$, the outer end of which said arm 29 is provided with the hook portion $29^a$ and the rear end is provided with the slot $29^b$.

30 is a rod or short shaft journaled in the arm extension $30^a$ and in the upright $30^b$ from the frame part $A^5$, the rod 30 being provided with the lateral projection 31, carrying the short rod $31^a$, the outer end of which is purposed to be carried in the slot $29^b$ of the arm 29. On the outer end of the shaft $S^4$ is carried the disk 32, which is provided with the antifriction-rollers $32^a$ on its inner face.

33 is a disk journaled on the shaft $S^4$ to the rear of the disk 32 and is provided with the hub projection $33^a$, which is serrated or provided with the ratchet-face at $33^b$, adapted to be engaged by the tension-held dog or finger $33^c$, supported upon the arm $33^d$ of the standard.

$33^e$ is a roller journaled on the inner face of the disk 33 and near its periphery. On the face of the hub projection $33^a$ is provided a lug 34, pivoted at $34^a$ thereto and held under tension by means of the spring $34^b$, the outer end of which said lug is adapted to be alternately engaged by the hook $29^a$ of the arm 29.

35 is a short shaft arranged transversely across the bed-frame and supported or journaled in the bracket-supports $35^a$ $35^b$, secured to the frame-support $A^5$. Upon the outer end of the shaft 35 is carried the lever 36, extending down between the revoluble clamps C, the end of the lever having a U formation adapting the same to straddle the shaft D.

$36^a$ is a roller resting upon the cam-face $36^b$ of the pinion, and when contacted with by the irregular face of said cam $36^b$ it will raise or lower the lever 36, actuating the said shaft 35 in a manner and for a purpose to be described.

37 is a sleeve carried upon the shaft 35 and is provided with arm extensions from either end thereof $37^a$ $37^b$, the arm $37^a$ extending upward to a point shown in Fig. 19 and has suitably bolted thereto the arm or dog $37^c$. The arm $37^b$ extends in opposite directions from the sleeve and is curved outwardly, as shown, from its upward extension and has journaled thereto the roller $37^d$, the sleeve, with its arm extensions, suitably held under tension by the spring $37^e$.

38 is an arm extension similar to the arm $37^a$ and is provided with the arm or dog extension therefrom, $38^a$, the arm 38 being held under tension by means of the spring $38^b$. The arm extension or dogs $37^c$ and $38^a$ have a bearing relation with or are adapted to contact with the arm 39, which is suitably secured to the shaft or rod 30 and is held under lateral extension by the spring $39^a$. The rear end of the arm 39 is provided with the roller $39^b$, which has a bearing relation with the straps $t\ t\ t\ t$, which are secured to the face of the cam $T^3$ on shaft W. The arm 39 is held under an up or down pressure by means of the mechanism shown at $39^c$, consisting of an adjustable rod and spring connection.

The parts just above described are purposed to be operated when the carriage has traveled its length upon the bed and when the parts are in a position for the cable-sections to be operated, adapting the automatic shaft to be operated and the parts connected therewith, the parts being actuated by means carried on the carriage. These parts are also adapted to be operated at a time when the clamp is purposed to be revolved or just after the twisting of the cable-strands and adapted to be actuated by means carried on the lower portion of the bed-frame. At one end of the carriage is carried the plate or lug 40, provided with the irregular bearing-faces adapted to contact with the roller 37$^d$ on the arm 37$^b$, the contacting of these parts being at a time when the carriage is in the position shown in the drawings or at the right-hand side of the machine. The mechanism provided for contacting with this roller when the carriage has moved to the opposite side of the bed consists of the roller 40$^a$, suitably journaled to the arm extension 41, which is secured to the frame part G$^3$. (More particularly shown in Fig. 9 of the drawings.)

As the carriage traverses back and forth across the bed-frame it will when it reaches either side thereof operate certain parts which have a bearing relation with parts of the carriage which when operated will cause the automatic shaft W' to be revolved, the power being directly applied from means carried on the shaft S$^4$. The automatic shaft in its rotation carries with it suitable cams, located on either end thereof, and are referred to as the cams 8, which when operated will alternately shift the clutch-arms 27 27$^a$ and will alternately actuate the rod 7, which controls the twisting of the cable-sections located at the outer and inner end of either of the adjoining series. In the drawings the carriage is located on the right side of the centrally-located power mechanism and is shown to be in position when the carriage has traveled the length of the series upon which and with which it has been working and is now ready to have the cable-sections of either of the series make their twist. Immediately following the clamping mechanism will be rotated and the parts connected therewith, adapting that portion of the fence which has just been twisted together to be drawn out and the several parts again placed in readiness to adapt the carriage to be moved back.

The several working parts of the machine having been assembled in the respective positions on the machine and parts described, as hereinbefore set forth, we will now describe the working of the entire machine as in combination the one with the other, showing the manner of delivering the wires to the twisting mechanism and from thence in the form of a woven fence to the revolving clamp, and then to any suitable means for rolling the fence into a roll ready for shipment. The strand-wires having been placed in the spool-carrying frames provided at the rear of the machine and carried forward and then through the stationary twister - sections of both series provided in the bed-frame and the weft-wires having been suitably placed in their proper position on the shiftable carriage, the operator to start the machine will pull the lever V, which through the several lever connections, consisting of the arm V$^2$ and the angle arm V$^3$, will actuate the clutch-operating part V$^4$, which contacts with the pulley-wheel A$^2$, which is provided with the internally-carried wedge-clutch contacting with the revolving skeleton or frame, which sets in motion the main driven shaft A', which controls the main operating parts of the machine. The actuation of the shaft A' will cause the pinion S$^2$ to be revolved, which is fast thereon, which will impart motion to the shaft S, journaled in the uprights A$^7$, through the chain connection s. Simultaneously with the operation of these parts just above described the arm 40 on the carriage will be caused to be contacted with the curved arm 37$^b$ through the roller 37$^d$, connected therewith, which will release the dog 37$^c$ from the arm 39. The arm being held under tension will be raised at its rear end, causing the rod 30 to be turned, which through its connection by the short rod 31$^d$ with the arm 29 at its opposite end causing the catch 29$^a$ to be released from the dog 34, throwing the same into engagement with the shaft S, which in its operation will through its cam-and-roller connection engage the octagon-shaped disk and the laterally-extending arm therefrom, which terminates in the revolving of the automatic shaft W, the cams 8, which are connected and revoluble with the shaft W, will be caused to rotate as the shaft is revolved, and, referring to Fig. 5, it will be seen that the cam 8 to the left is about to engage the roller 7$^b$ on the bar 7$^a$, which has pivoted thereto the rod 7, which extends down and is purposed to contact with one end of the angle-frame plate or dog 9, which has a bearing relation with a collar carried on the rod 12, which when operated causes the lug extension 11$^a$ 11$^b$ to be disengaged from the cam 6 and the extension 5$^a$ of the clutch, which sets the cable-sections in operation. At the same time these parts are operated the lug 13$^d$ will contact with the arm 13$^b$, which will disengage the arm 13, which also contacts with the cam 6. The cam 8 is timed in its rotation, which allows of the parts being operated sufficiently for the purpose of twisting the cable-sections. The arm 13 and the lug 11$^a$, held under tension, will drop back into their normal positions and will engage the cam 6 in the manner shown in Fig. 16, operating upon the cam in such a manner as to immediately stop the movement of the cable-sections after they have made their twist. The operation of either one of the cams 8 will operate upon the cable-sections in the manner above described, which will cause the cable-sections of the inner and outer one of either of the series to be operated simultaneously. Immediately following the twisting of the cable-sections, and supposing that a series of twists have been made, the revolving clamp and its connections will be caused to be operated and the wire fabric drawn out of the sections a sufficient distance to allow of another series of twists to be made. The operation of the shaft W will cause the cam T, which is carried thereon, to be rotated, and as the same is rotated the regular face, which is bearing against the roller T$^2$ on the arm T, will cause the rear end to be lowered through the rod T³, which is held under a strong spring tension, which, through the arm T⁴, will cause the clutch-operating parts at U to be engaged, which will cause the shaft E to be rotated through power which is derived from the driven shaft A', the sprocket E², and the chain connection to the sprocket E³, connected with the clutch-operating part U. Power will then be delivered from the pinion E' at the rear of the clutch through chain connection of the sprocket E³ and from thence to the pinion C' through the pinion $d$ and chain connection to the sprocket D', the pinion C' meshing with the gearing suitably carried on the clamps C, which will cause the same to be rotated. As the pinion $c'$ is revolved the irregular face of the cam 36ᵇ, which is integral therewith, will contact with the roller 36ᵃ, which has a bearing relation therewith and which is journaled on the lever 36, which will actuate the short rod or shaft, causing the dog extension 38ᵃ from the arm 38 to be released from the arm 39, which will release the parts controlling the action of the automatic shaft, allowing the same to be revolved, which causes the cam 8, which is timed in this operation, to reverse the levers 27 27ᵃ, which control the movements of the carriage in either direction, throwing into gear the clutch-operating parts L⁴, which will move the carriage in the opposite direction to the position it now occupies. As the shaft W is revolved the cam-wheel T³ will also be revolved, which throws the straps $t$, which are suitably secured to one of its sides, into contact with the arm 39 and draws the same back into its normal position, as is shown in Fig. 20. At the same time as the automatic shaft is being revolved the irregular face of the cam-wheel 24, which controls the automatic clutch-brake, will contact with the roller 23ᵈ on the arm 23 and will cause the brake 23ᵇ to contact with the peripheral face of the clutch L, immediately stopping the rotation of the same, preventing any motion of the parts to connect with the clutch-reversing mechanism when the same is reversed. The parts having been reversed through the rotation of the shaft K, the pinion I, the shaft H, and the pinion J, meshing with the rack G³ of the carriage, the carriage will move forward until the twister-sections carried therein are coincident with the stationary twister-sections of the intermediate sections on the bed. At this time the lug $g^5$ on the carriage contacts with the roller 22ᵃ on the arm 22, which is secured to the rod or upright shaft 19, causing the same to be shifted, which will release the arm 20ᵃ from the lug 17ᶜ of the arm 17ᵇ, reversing the movement of the parts that move the carriage and causing the pinion R' to mesh with the gear-wheel R on the short shaft $r$, meshing with the pinion P, which has spline-and-groove connection with the longitudinal shaft O² of the carriage, and which meshes with the gear-wheel P', which has secured thereto the partially-toothed gear-wheel P³, which is normally in a stationary position, and in its rotation is timed and actuated by the shaft H, through the pinion Q', carried by and rotatable with said shaft. In the rotation of the shaft H the lug projection $q$ on the sleeve Q is adapted to engage with the recess $p$ formed in the face of the gear P³, and rotates it a sufficient distance until the teeth thereof engage with the pinion Q', which will result in the forward end of the sleeve Q being seated in the recesses $g^2$ of the carriage, which will insure the carriage being held a length of time sufficient to allow for the twisting of the sections simultaneously with these movements. The shaft O², as it is actuated, will, through the pinions U and U', carried thereon at either end, mesh with the bevel-gears U² and U³, carried on the cross-shafts O O'; and which said shafts carry the partially-toothed wheels V and V' at their rear, which mesh with the partially-bevel gears $f^5$, integral with the rear end of the intermediate twister-sections, and are caused to be thrown into gear by the straps or plates $v\ v'$, which in their rotation contact with the lugs $f^6$ on the pinions $f^5$ of the sections and cause them to turn, which will throw the matching teeth of the two gear-wheels into gear, which will terminate in the rotation of the traveling sections with the intermediate sections of the bed. In the rotation of the shafts O O' the cams S are caused to be rotated through the mechanism already described, which will actuate the spindles S³, which will cause the dogs P³ connected therewith, to grip the weft-wire and draw the same out and to hold the same a sufficient length of time to insure the twist of the weft-wires with the strand-wires to be uniform throughout. In the rotation of the parts as has just been described the cam 21, which is carried on the shaft $r$, will contact with the roller on the arm 21ᵃ, which will raise the arm 20ᵃ as the same is making its lateral movement from the contact by the lug $g^5$ on the roller 22ᵃ on the arm 22, and as soon as the parts have finished their operation for twisting the arm 20ᵃ will again contact with the lug 17ᶜ on the arm 17ᵇ and reverse the mechanism, as hereinbefore described.

The operation of the parts, as before described, will be continued and the carriage will travel the length of the series and the shifting sections carried therein will be caused to match with each of the succeeding twister-sections, and when the shifting sections are coincident with the cable-sections at the opposite end the automatic shaft will again be rotated and the parts be caused to operate, which will terminate in the twisting of the cable-sections, and the clamp through the several operating parts will be caused to rotate, advancing the wire mesh that has been twisted thereon to the rear of the machine and rolling it upon a suitable reel.

Having thus fully described our invention, what we claim, and desire to secure by Letters Patent, is—

1. In a fence-fabric machine, the combination of stationary upright frame-supports, of a bed-frame arranged upon said supports and at right angles therewith, of a series of stationary twister-sections arranged at intervals apart and at graduated distances throughout the bed-frame, a suitable carriage supported upon and adapted to travel upon said bed, of intermittingly-rotated twister-sections at opposite ends thereof, having a matching relation with the twister-sections upon the bed-frame and revoluble therewith, means for shifting said carriage, consisting of an intermittingly-rotated cog-wheel, actuated by suitable means and engaging a cog-rack on the carriage, mechanism for alternately stopping and starting the carriage, mechanism for conjointly actuating the end or cable sections of the bed with those of the carriage independent of the mechanism for actuating the intermediate sections, all substantially as and for the purpose described.

2. In a fence-machine for weaving wire-fence fabric, a stationary frame supporting a bed-frame carried upon and at right angles to said frame, recesses formed in said bed-frame at graduated distances apart thereon, purposed to support stationary sections adapted to be carried therein, cable-sections carried at either end of the series, of a traveling carriage, carried upon said bed-frame and above said twister-sections, mechanism suitably timed in its operation to actuate the cable-sections independent of the mechanism for actuating the intermediate sections, twister-sections carried in detachable shoes in opposite ends of the carriage and provided with half-journals, mechanism supported on said carriage actuated by means supported by the bed and adapted to simultaneously rotate the sections on the bed with the sections of the carriage when they are coincident, mechanism for advancing said carriage, mechanism for alternately stopping the same so as to give it a step-by-step movement on the bed, in the manner described.

3. In a fence-machine for weaving wire-fence fabric, the combination of upright frame-supports, of a bed-frame consisting of suitable vertically-carried frame parts arranged at right angles to and across said supports, each grooved in such a manner as to adapt a traveling carriage to be supported and travel thereon, of a series of depressions or cut-outs arranged in said bed-frame, and at intervals apart thereon, and graduated from either end thereof, of a traveling carriage supported upon said bed-frame and adapted to travel thereon, matching twisting-sections movable with said carriage and suitably supported therein, adapted to be revolved with the stationary twister-sections successively as the carriage is moved across said frame, suitable shafting supported by said carriage and rotatable thereon by suitable intermeshing gearing and actuated by suitable intermitted mechanism, suitable shafting and gearing supported by the bed adapted to advance said carriage in a step-by-step motion and adapted to be intermittingly stopped and started at intervals, to allow for the twisting of said sections when coincident with the sections of the carriage, mechanism for automatically advancing and reversing said carriage, and mechanism for drawing out said fabric as the same is woven, in the manner specified.

4. In a woven-wire-fence machine, the combination of suitable frame-supports, a bed-frame carried upon said supports consisting of vertically-carried frame parts transversely supported upon said frame-supports, each provided with cut-outs or depressions at graduated distances from either end of the bed-frame, stationary twister-sections having suitable half-journals supported in said depressions, and stationary with reference to the movement of the carriage but rotatable with reference to the moving sections, of a carriage having a bearing and sliding relation thereon and having two operative twister-sections, located at opposite ends thereon and actuated by means supported on said carriage which is intermittingly actuated thereon and movable therewith, mechanism supported in a stationary bed-frame provided with intermediate gearing intermeshing with suitable gear on the carriage, adapted to alternately advance and reverse said carriage and stop it at intervals in the length of the bed, substantially in the manner described.

5. In a woven-wire-fence machine, the combination with a bed-frame supported upon suitable upright frame-supports, the bed-frame composed of vertically-carried frame parts, the upper edges of which are grooved lengthwise and provided with cut-outs or depressions at intervals thereon, and suitably provided with cut-outs or depressions graduated in distances from a point central thereon to the opposite ends thereof, twister-sections journaled in said depressions the arrangement of the same forming a set of two series through which strand-wires are carried purposed to be intermeshed with separate weft-wires carried by a traveling carriage when the same are coincident with each respective wire of the two series, mechanism for automatically advancing said carriage in opposite directions, mechanism for stopping and starting said carriage in the manner described, of the mechanism for simultaneously operating said shifting sections with the intermediate sections, and of means independently carried on said carriage for actuating said outer or cable sections, all substantially as and for the purpose set forth.

6. In a fence-machine, the combination of a bed-frame supporting suitable twister-sections at intervals apart thereon and at graduated distances from either end thereof, a carriage supported upon the upper face thereof and shiftable thereon, shifting sections journaled in shoes at either end of said carriage and adapted to match successively with twister-sections of the bed-frame which are arranged in series at either side of the central part of the machine, the shifting sections at either end of the carriage matching alternately with each one of the lower twister-sections as the carriage traverses the bed-frame, mechanism for simultaneously actuating the intermediate sections of either of said series simultaneously as the same are coincident with the sections of the carriage, mechanism supported by said bed purposed to alternately actuate the outward and inner cable-section of the opposite series independently of the mechanism for rotating the intermediate sections, substantially as described and shown.

7. In a wire-fence machine, composed of a bed-frame, a series of twister-sections supported in said frame, and adapted to have strand-wires carried therethrough, a carriage supported upon said frame and above said sections, carrying matching twisting-sections with the lower series of sections, at opposite ends of the carriage, and in suitable detachable shoes therein transversely-carried shafts at opposite ends of the carriage and in a plane with the twister-sections of suitable gearing intermeshing with gearing on the twister-sections of the bed purposed when the half-journals of the traveling and stationary sections are coincident to be rotated conjointly, mechanism supported on the carriage adapted to be actuated by mechanism on the bed at predetermined periods for the purpose of intermittingly and alternately rotating the twisting-sections thereon, substantially as described.

8. In a wire-fabric machine, a series of stationary twister-sections, suitably carried in a bed-frame and adapted to have strand-wires carried therethrough, the sections carried in a series on either side of a centrally-disposed power mechanism carried upon said machine, each series of sections graduated in distances one from the other on the length of the bed, and cable-sections adjusted at the inner and outer end of each of the series, of a carriage mounted in the same horizontal plane and traveling the length of each of the series, shifting sections mounted in opposite ends thereof purposed to carry weft-wires which are intermittingly rotated and adapted to coincide and to be twisted with each of the strand-wires carried in said bed, mechanism for actuating the intermediate strands which are located between the outer or cable strands, the same being independent of and controlled by means separate and distinct from the mechanism for twisting the cable-strands, a longitudinally-carried driving-shaft mounted on said carriage having a sliding relation with reference to the mechanism for rotating said shaft, and of the means actuated by suitable gearing on the longitudinal shaft for intermittingly rotating the twisted sections carried on the bed, mechanism carried by said carriage engaged by means for automatically advancing and reversing said carriage, and mechanism for stopping and starting the carriage as the same advances on said bed and at a time when the shifting sections of the carriage are coincident with the twisting-sections of the bed, all substantially as described and shown.

9. In a wire-fabric machine, the combination of a double series of twister-sections carrying strand-wires and suitably adjusted in a bed-frame and at intervals apart thereon, cable-sections carried at either end of the series, a shiftable carriage carried above said sections having shifting sections suitably journaled therein carrying a weft-wire and means for twisting said intermediate sections and for moving said carriage, of the mechanism centrally located on the bed-frame for advancing and reversing the movement of said carriage through suitable shafting having a bearing and sliding relation with the mechanism for advancing said carriage, of suitable clutch-regulating mechanism connected with the cable-twisting sections, of the mechanism actuated thereby for rotating said cable-twister sections, the inner and outer cable-sections of the opposite series being rotated simultaneously as the carriage advances from one side of the series to the other, all substantially as described and shown.

10. In a wire-fabric machine, the cable-twister sections each being provided with two half-journals having flat bearing-faces in the same plane, the rear end of each being respectively provided with two perforations and the forward half-journals of each having two centrally-disposed wire-delivery passages, of suitable mechanism on the rear end of each cable-section matching suitable power mechanism carried on the frame that is actuated from the centrally-disposed power located thereon and which said power is timed in its operation for actuating said cable-sections simultaneously, all substantially as and for the purpose set forth.

11. In a wire-fence machine, the combination with a shifting carriage thereof having a bearing and sliding relation with the bed-frame in which the twister-sections carrying the strand-wires are carried, carrying shifting sections in opposite ends thereof, of the longitudinally-carried shaft $O^2$, the transverse cross-shafts $O, O'$, suitable gear-wheels carried on said shafts adapted to be actuated by the centrally-disposed power mechanism on the machine, for actuating said shiftable sections and intermediate sections on the bed, all substantially as and for the purpose set forth.

12. In a wire-fabric machine, the combination with a stationary frame supporting a bed-frame carried upon said bed, of a shiftable carriage carried thereon and having a bearing and sliding relation thereon, the shafts $O, O'$, and $O^2$, supported in standards suitably mounted upon said carriage, of the rack $G^3$, and the bar $G^4$, provided with the depressions $g^2$, mounted and running longitudinally on said carriage, all substantially as and for the purpose set forth.

13. In a wire-fence machine, the combination of stationary uprights supporting a bed-frame carried transversely thereon, a suitable carriage carried thereon and having a bearing and sliding relation therewith, the rack $G^3$, mounted longitudinally on one side thereof, actuated by a pinion suitably carried to mesh therewith, the shafts O, O', mounted transversely on said carriage and in the standards N, N', $N^2$, $N^3$ provided thereon, the shaft $O^2$, mounted longitudinally on said carriage and journaled in the standards N', $N^2$, the gear-wheel P', mounted on the shaft $O^2$, and having a spline-and-groove connection therewith, of means for actuating said carriage through the rack $G^3$, and for rotating the shafts O, O', and for intermittently stopping and starting the same, all substantially as and for the purpose forth.

14. In a woven-wire-fence machine, the combination with a stationary bed-frame, of a suitable carriage traveling thereon and having a bearing and sliding relation therewith, removably-carried shoes at opposite ends of said carriage and supporting a suitable frame in which is adapted to be carried a spool with weft-wires wound thereon, of suitable shafting journaled on the upper side of said carriage and at opposite ends thereof and provided with suitable segmentally-arranged cog-wheels actuating suitable oscillating mechanism supported on the forward face of the carriage, the same being adapted to intermittingly actuate suitable engaging fingers adapted to grip weft-wires and pull the same forward and detain them in their proper position as the same are twisted with the wires of the bed, all substantially as described and shown.

15. In a woven-wire-fence machine, a bed-frame supported on suitable stationary supports, depressions formed at intervals in said bed, twister-sections journaled in said depressions and having strand-wires carried therethrough, a shiftable carriage supported and traveling the length of said bed and carrying weft-wires therein, adapted to match and twist with the strand-wires carried on the bed, means for pulling out the weft-wires and retaining the same during the twisting of said wires, consisting of the cams S, arm extensions S', actuated by said cams, the gear-wheels T, and T', meshing with the toothed rack s', on the arm S', the spindles $S^3$, provided with an extension at their lower ends carrying dogs $T^3$, means for intermittently operating said pull-out mechanism and for advancing said carriage, all substantially as and for the purpose set forth.

16. In a wire-fabric machine, the combination with a shiftable carriage having a bearing and sliding relation with the bed of said machine, twister-sections stationary with relation to said bed provided with the partially-toothed bevel gear-wheels $F^3$, and with the lugs $f^6$, projecting therefrom, shifting sections journaled in each end of the carriage and having a matching relation with the sections of the bed, of the shafts O, O', $O^2$, suitably journaled on said carriage and actuated by mechanism centrally disposed on said machine, partially-toothed bevel gear-wheels V, V', journaled on the rear of the shafts O and O', straps $v$, $v'$, secured to the face of the wheels V, V', purposed when the wheels V, V', are actuated to engage the lugs $f^6$, on the wheels $F^3$, of the lower twister-sections turning them sufficiently to engage and mesh with the wheels V, V', of the carriage for causing the twisting of said sections, all substantially as and for the purpose set forth.

17. In a wire-fabric machine, the combination of a series of twister-sections carrying strand-wires and suitably adjusted in a bed-frame and at intervals apart thereon, cable-sections carried at opposite ends of the series and operated independently of the means for actuating the intermediate sections, the main driven shaft A', carrying the bevel-pinions 4, meshing with the intermediate clutch-carried bevel-pinion 3, the shifting sections $f^3$, carrying the pinion $F^4$, actuated by the pinion 5 and controlled and operated by the clutch-carried pinion 3, of a suitable cam fixed on the inner ends of the shifting section $f^3$, suitable engaging dogs with said cam, and intermediate mechanism between the same and the centrally-disposed power mechanism adapted when actuated to intermittently release the cam 6 permitting the rotation of the twister-sections, all substantially as and for the purpose described.

18. In a wire-fabric machine, the combination of a series of twister-sections carrying strand-wires and suitably adjusted in a bed-frame and at intervals apart thereon, cable-sections carried at the outer and inner ends of the series, and operated independently therefrom, of means suitably driven from the main driven shaft A', for automatically operating the rod 7, which actuates the tension-held rod 10, through suitable connection releasing the clutch-held pinion 5, mounted on the short shaft 1, causing the rotation of the cable-twisting sections through and by means of the continuously-operated pinions 4, and the loosely-mounted clutch-pinion 3, all substantially as and for the purpose set forth.

19. In a wire-fabric machine, the combination of a series of twister-sections carrying strand-wires and suitably adjusted in a bed-frame and at intervals apart thereon, of cable-sections carried at the outer and inner end of each of the series, a shiftable carriage carrying matching twister-sections with the sections of the bed, partially-toothed gear-wheels carried on the intermediate sections and provided with lugs projecting upwardly from their inner faces when in a normal position, of suitable matching segmentally-toothed gear-wheels carried at each end of the carriage provided with straps for engaging the lugs on the gear-wheels of the sections when the same are operated for causing a matching relation with the teeth of the matching gear, suitable gear-wheels on the extreme rear ends of the cable-sections having a matching relation with suitable clutch-controlled gear-wheels, of suitable gearing mounted on said carriage adapted through suitable intermediate mechanism supported on the bed to actuate the same for the purpose of transmitting motion to the gearing for rotating the twister-sections of the bed, mechanism for advancing said carriage and means supported thereby engaging suitable mechanism for stopping the carriage at the intersection of each twister-section of the bed for the purpose of twisting the weft-wires therewith, all substantially as and for the purpose described.

20. In a wire-fabric machine, the combination with suitable upright frame-supports, a bed-frame adjusted on said supports, a traveling carriage supported on said bed and having a bearing and sliding relation thereon, the main driven shaft A', the shaft K continuously rotated thereby alternately in opposite directions through suitable gearing, and clutch-operating parts controlling the movement thereof, mechanism supported and actuated by shaft K to intermittingly advance the carriage in a step-by-step movement, the means supported by said carriage actuating suitable intermediate mechanism between that and the means for advancing said carriage purposed at given times to reverse the movement thereof for stopping said carriage when the twister-sections thereof are coincident with the twister-sections of the bed, all substantially as described and shown.

21. In a wire-fabric machine, the combination with suitable upright frame-supports, a bed-frame adjusted on said supports, a shiftable carriage supported on said bed and having a bearing and sliding relation thereon, the main driven shaft A', the shaft K, controlled and actuated by the shaft A', and suitably journaled in standards supported on the bed-frame the shaft H, journaled at right angles to the carriage provided with the bevel-gear I', meshing with the bevel-gear I, revoluble with the shaft K, the gear-wheel J, on the forward end of the shaft H, meshing with the rack $G^3$, of the carriage, means for operating the shaft A', and for shifting into or out of mesh the pinion I', with the pinion I, and for intermittingly advancing the carriage and stopping it at intervals the length of the bed, all substantially as and for the purpose described.

22. In a wire-fabric machine, the combination with suitable upright frame-supports, a bed-frame adjusted on said supports, a shiftable carriage carried on said bed and having a bearing and sliding relation therewith, the main driving-shaft A', the shaft K, controlled and actuated by the shaft A', and suitably journaled in standards supported on the bed-frame, the transverse shaft H, journaled in standards above the plane of said carriage, the pinion J, meshing with the rack $G^3$, and receiving its power from the pinion I, meshing with the pinion I', on the shaft K, for advancing the carriage on said bed, of the carriage-shaft $O^2$, the gear-wheel P', having a spline-and-groove connection with said shaft, the intermediate shaft $r$, carrying the gear-wheel R', meshing with the gear-wheel P', and receiving its power from the pinion R, on the shaft K, purposed to actuate the carriage-shaft $O^2$, alternately for the purpose of operating the twisting-sections on the bed, all substantially as and for the purpose set forth.

23. In a wire-fabric machine, the combination with suitable upright frame-supports, a bed-frame adjusted on said supports, a shiftable carriage supported on said bed and having a bearing and sliding relation therewith, the driving-shaft A', meshing with suitable means for advancing the carriage on the bed, of the means for engaging said carriage for intermittently stopping said carriage at intervals the length of the bed, of the shaft H, journaled at right angles to the bed and in a plane above the carriage, the sleeve Q, loosely mounted on said shaft, and provided with the pinion Q', and the lug $q$, from the inner end of said sleeve, of the partially-toothed bevel-gear $P^3$, provided with the notch $p$, and having the gear-wheel P, on its opposite face receiving power from suitable intermediate gear actuated by the shaft A', causing the lug $q$, when the wheel $P^3$, is operated to engage the notch $p$, throwing into mesh the bevel-pinion Q', with the teeth of the bevel-gear $P^3$, revolving the sleeve Q, until the bulging face thereof drops into the depression $g^2$, of the carriage coincident therewith, holding the same until the operation is reversed causing the carriage to be moved to the next adjoining section on the bed, all substantially as and for the purpose described.

24. In a wire-fence machine, the combination of a bed-frame, a traveling carriage mounted upon said bed and having a bearing and sliding relation thereon, of the main driven shaft A' supported in standards on the main bed-frame, centrally-disposed power mechanism upon said bed and located in a plane above the shaft A', the cross-shaft H carrying suitable gearing on opposite ends thereof and actuated by mechanism intermediate the shaft A', a rack-bar supported by the carriage and adapted to impart motion thereto through the gearing on the outer end of the shaft H, at determined periods through the intermediate rotation of the shaft H actuated by suitable clutch mechanism forming a part of the main operating parts thereof, the shaft H carrying suitable mechanism intermediate the two ends thereof purposed when the carriage has advanced to a determined point to engage means thereon for retaining the same when the twister-sections of the carriage and bed are coincident the one with the other, substantially as and for the purpose hereinbefore described.

25. In a woven-wire-fence machine, the combination, of a bed-frame, a traveling carriage mounted upon said bed and having a bearing and sliding relation therewith, stationary twister-sections mounted at intervals or graduated distances on said bed, cable-sections at each end of the bed, matching twister-sections mounted in and adapted to travel with said carriage, the shaft K mounted in suitable standards supported upon the bed and lying in a horizontal plane with the shaft A' and above the same, clutch-controlling mechanism supported by said shaft and timed in their operation to intermittingly actuate suitable gearing for advancing said carriage in a step-by-step movement and for stopping the same at intervals in the length of the bed at a time when the twister-sections thereof are coincident with the twisting-sections on the carriage, mechanism for actuating the intermediate sections, mechanism independent of the means for actuating the intermediate sections for actuating the inner and outer cable-sections simultaneously, mechanism supported by said carriage-engaging means supported on said bed adapted to automatically reverse the movement of the shaft K, through suitable clutch-operating mechanism, substantially in the manner and for the purpose described.

26. In a wire-fabric machine, the combination, of the main frame, a bed supported upon said frame, of a traveling carriage having a bearing and sliding relation upon said bed, of means for advancing said carriage and stopping it at intervals the length of said bed, consisting of the vertically-carried shaft 19, having the arm extension 20$^a$, therefrom controlling the arm 17$^b$, for reversing the clutch-operating parts L$^2$, L$^3$, arranged on the shaft K, of the arm 22, secured to said shaft 19, and provided with a roller carried on its outer end, adapted to be engaged by the lugs $g^5$, on the carriage, of the means actuating the shaft K, and for disengaging the arm 20$^a$, from the lug 17$^c$, on the clutch-operating arm 17$^b$, all substantially as and for the purpose set forth.

27. In a wire-fabric machine, the combination of the main frame-supports, a bed-frame suitably supported upon said bed, a shiftable carriage mounted on said bed and having a sliding relation thereon, of the driving-shaft A', the shaft K, revoluble through suitable chain-and-sprocket connections with the shaft A', of the double clutch-frames L, and L' mounted on the shaft K, the clutch-operating parts L', and L$^4$, controlling the forward or backward movement of the carriage upon the bed, the clutch-arms 27, 27$^a$, automatically operated through intermediate mechanism from parts of the carriage for shifting the clutch-operating parts L', L$^4$, on the shaft K, adapted to be operated when the carriage has reached either end of its movement on the bed, all substantially as and for the purpose set forth.

28. In a wire-fabric machine, the main bed-frame supporting a traveling carriage having a bearing and sliding relation therewith, the standards A$^6$, the shafts A', K, S$^4$, and W', suitably journaled therein, the shafts A', continuously operated through the pulley-wheel A$^2$, and the shafts K, and S$^4$, revoluble therewith through suitable chain-and-sprocket connections, the shaft W', automatically actuated through suitable connections with the shaft S$^4$, carrying suitable cams controlling the operation of the clutch-sleeves L', and L$^4$, moving the carriage backward and forward, an automatic brake controlled by the automatic shaft W', engaging the clutch-frame L, when the clutch parts are reversed in the several movements of the carriage, all substantially as and for the purpose set forth.

29. In a wire-fabric machine, the combination, of a bed-frame, a shiftable carriage supported upon and having a sliding relation thereon, the shaft A', journaled in suitable supports, of the shaft K, having the clutch-frames L, and L', the shaft K, revoluble with the shaft A', through suitable chain-and-sprocket connection therefrom, the automatic shaft W', revoluble at intervals through suitable connections from the shaft S$^4$, the cams 8, carried at opposite ends upon the shaft W', the clutch-arms 27, 27$^a$, controlled by the operation of the automatic shaft W', and the cams 8 adapted when the carriage has traveled the length of the bed through suitable parts carried thereon to actuate suitable means for revolving the shaft W', causing the operation of the clutch-sleeves L', L$^4$, through the arms 27, 27$^a$, for reversing the movement of said carriage, all substantially as and for the purpose set forth.

30. In a wire-fabric machine, the combination of a main frame, a bed supported upon said frame, suitable twister-sections carrying strand-wires arranged at intervals apart the length of said bed, cable-sections carried at each end of the series and actuated independently of the means for actuating the intermediate sections, of a suitable carriage mounted on said bed and having a sliding relation therewith adapted to have matching twister-sections carried in opposite ends thereof, suitable spools carrying weft-wires which are adapted to be carried through the sections of the carriage purposed to be twisted with the strand-wires successively when the same are coincident therewith, of the means for advancing said carriage and stopping it at intervals the length of said bed, a revolving clamp over which the fabric is carried and which is suitably journaled in front of said bed, means for intermittently rotating said clamp suitably carried and actuated from the automatic shaft W', consisting of the cam T$^3$, the arm T$^4$, provided with the roller T$^5$, engaging the irregular face of the cam, the rod $T^6$, pivoted to the arm $T^4$, and the angle-arm $T^7$, pivoted to the lower end of arm $T^6$, which through suitable intermediate gearing rotates the clamp and of the means for rotating the automatic shaft W', through suitable mechanism carried on the shiftable carriage, all substantially as and for the purpose set forth.

31. In a wire-fabric machine, a suitable carriage mounted upon a bed-frame and adapted to travel the length thereof, twister-sections suitably supported in said bed and at intervals apart thereon, cable-sections carried at opposite ends of the carriage, twister-sections suitably journaled in the ends of the carriage and having a twisting relation with the sections of the bed, of the means for twisting the intermediate sections successively, of the means for rotating the cable-sections alternately and simultaneously, the outer and inner sections of either of the series of sections carried in the bed, the automatic shaft W', indirectly operated from the shaft A', through the shaft $S^4$, and mechanism carried thereon, of the short shaft or rod 35 supported transversely above the moving plane of the carriage, and of the means journaled thereon adapted to be engaged by suitable mechanism carried on the carriage for actuating the parts for revolving the automatic shaft, all substantially as and for the purpose set forth.

32. In a wire-fabric machine, the combination of the main frame, a bed supported upon said frame, of a traveling carriage having a bearing and sliding relation thereon, the continuously-operated shafts A', and $S^4$, the automatic shaft W', suitably journaled in standards and actuated by means carried on the shaft $S^4$, of the short shaft or rod 35, provided with the lever 37, having the arms $37^a$, $37^b$, therefrom, the arm $37^b$, carrying the roller $37^d$, purposed to be contacted with by suitable mechanism carried on the carriage when the same has traveled the length of the bed purposed to actuate suitable intermediate mechanism for rotating the shaft W', and for reversing the movement of the clutch-sleeves L', $L^4$, for reversing the movement of the carriage, all substantially as and for the purpose set forth.

33. In a wire-fabric machine, the combination of the main frame, a bed supported upon said frame, of a traveling carriage having a bearing and sliding relation thereon, the continuously-operated shafts A' and $S^4$, the automatic shaft W', suitably journaled in standards and actuated by means carried on the shaft $S^4$, of the short shaft or rod 35, provided with the sleeve 37, having the laterally-extended arms $37^a$ $37^b$, the arm 38 journaled on said shaft, of the short shaft 30 actuated by suitable intermediate mechanism from the arm $37^a$ 38, engaging suitable means controlling the operation of the automatic shaft W', of the means for starting and stopping said parts and for intermittently operating the shaft 35, for releasing the means controlling the automatic shaft, all substantially as and for the purpose set forth.

34. In a wire-fabric machine, the combination, of the main frame, a bed-frame suitably supported on said frame, consisting of the frame parts F', $F^2$, depressions formed upon the upper face of the frame parts F', $F^2$, and at intervals apart the length thereof, of the twister-sections $f'$, $f^2$, $f^3$, $f^4$, supported in said depressions and carrying strand-wires therethrough, the sections $f^3$, $f^4$, carrying cable strands and operated by means independent of the means for actuating the intermediate sections $f'$, $f^2$, a shiftable carriage supported on said bed and having a sliding relation therewith, twister-sections carried at opposite ends in said carriage purposed to have weft-wires carried therethrough and adapted to match and twist successively with the twister-sections on the bed, of the continuously-operated shaft A', and K, actuating suitable means carried on said carriage for advancing the same, and for stopping it at intervals or at a time when the twister-sections of the carriage are coincident with the cable-sections on the bed, and of the means for automatically reversing the movement of said carriage and for drawing the fabric from the sections as the same is woven by the twisting of said sections, all substantially as and for the purpose set forth.

35. In a wire-fabric machine, composed of a bed-frame, a series of twister-sections supported in said frame and adapted to have strand-wires carried therethrough, a carriage supported upon said frame and above said sections, carrying matching twisting-sections with the lower series of sections, at opposite ends of the carriage, and in suitable detachable shoes therein transversely-carried shafts at opposite ends of the carriage and in a plane with the twister-sections, of suitable gearing intermeshing with gearing on the twister-sections of the bed purposed when the half-journals of the traveling and stationary sections are coincident to be rotated conjointly, mechanism supported on the carriage adapted to be actuated by mechanism on the bed at predetermined periods for the purpose of intermittingly and alternately rotating the twisting-sections thereon, of a pull-out mechanism movable with said carriage and rotatable with the transversely-carried shaft thereon consisting of suitable oscillating hangers having segmentally-cogged faces intermeshing with suitable means engaging the weft-wires which when actuated engage the weft-wires as the same are being twisted with the line-wires, in the manner and for the purpose described.

36. In a wire-fabric machine, the combination with a bed-frame supporting a centrally-disposed power mechanism and provided in the length of said bed with alternately-disposed shifting sections, a traveling carriage and matching twister-sections with those of the bed supported one in each of the opposite ends of the carriage, a rack-bar supported the length of one side thereof, and a bar carried adjacent thereto and longitudinally therewith and provided at intervals in the length thereof with suitable depressions, a driving mechanism intermittingly actuated for advancing the carriage, mechanism suitably carried by the means for driving the carriage adapted to intermittingly engage the depressions in the bar adjacent to the rack-bar thereof, substantially in the manner and for the purpose described.

37. In a wire-fabric machine, the combination with a bed-frame supporting a centrally-disposed power mechanism and provided in the length of said bed with alternately-disposed shifting sections, a traveling carriage and matching twister-sections with those of the bed, supported one in each of the opposite ends of the carriage, a rack-bar supported the length of one side thereof, and a bar carried adjacent thereto and longitudinally therewith and provided at intervals in the length thereof with suitable depressions a driving mechanism intermittingly actuated for advancing the carriage, mechanism carried by the means for advancing said carriage, intermittingly actuated by means intermediate the main power mechanism timed in its operation whereby a suitable cam is adapted to be rotated at intervals to engage with the depressions in the bar carried adjacent to the rack, mechanism for alternately advancing said carriage and for stopping the same at intervals in the length of the bed through the means herein described, substantially as set forth.

38. In a wire-fabric machine, the combination with the main bed-supporting twister-sections therein, a carriage traveling with a step-by-step motion across the bed, twisting-sections journaled in removably-carried shoes and at opposite ends of the carriage purposed to match and to be revolved simultaneously with the twister-sections of the bed when the same are coincident therewith, a rack-bar supported the length of one side thereof engaged by power mechanism for advancing the same on the bed, a bar supported adjacent thereto and provided with depressions therein engaged by intermittingly-actuated means for retaining the carriage when the twister-sections of the bed and carriage are coincident, lugs supported at opposite ends of the carriage-engaging means as the same is shifted from side to side of the bed to automatically reverse the movement of said carriage, all substantially as described and shown.

39. In a wire-fabric machine, the combination with the main bed-supporting twister-sections therein, a carriage traveling in a step-by-step motion across the bed, twisting-sections journaled in removably-carried shoes and at opposite ends of the carriage purposed to match and to be revolved simultaneously with the twister-sections of the bed when the same are coincident therewith, a rack-bar supported the length of one side thereof engaged by power mechanism for advancing the same on the bed, a bar supported adjacent thereto and provided with depressions therein engaged by intermittingly-actuated means for retaining the carriage when the twister-sections of the bed and carriage are coincident, lugs supported at opposite ends of the carriage-engaging means as the same is shifted from side to side of the bed to automatically reverse the movement of said carriage, a longitudinally-carried shaft on the carriage, transversely-carried shafts intermeshing therewith by suitable gearing actuated thereby, from means supported on said bed, mechanism carried by the transversely-arranged shafts engaging with means on the twister-sections of the bed purposed to impart a rotary motion thereto when the twister-sections of the carriage are coincident therewith, all substantially as described and shown.

40. In a wire-fabric machine, the combination with a carriage, shifting sections at opposite ends thereof and a series of shifter-sections supported in a bed on which the carriage is mounted, suitable gearing and the mechanism for imparting motion thereto, a pull-out and retaining mechanism supported by said carriage at opposite ends thereof, of the mechanism for imparting an oscillating movement to said pull-out mechanism, and the means for engaging with the wires supported by the carriage, substantially in the manner and for the purpose described.

41. In a wire-fabric machine, the combination with suitable traveling twister-sections carrying weft-wires supported by means having a longitudinal movement on said machine, a series of twister-sections carrying strand-wires, of the main driven shaft journaled in suitable supports on the carriage, mechanism for imparting motion thereto, shafts journaled in supports at opposite ends of the carriage, a pull-out mechanism supported by said carriage consisting of suitable spindles provided with lugs adapted to engage the weft-wires, cams carried by and rotatable with the shafting at the opposite ends of the carriage, and means intermediate the cams and the spindles for imparting movement thereto for pulling out said weft-wires, substantially as described and for the purpose set forth.

42. In a wire-fabric machine, a traveling carrier, shifter-sections at opposite ends thereof, a series of shifter-sections stationary with reference to the carrier and rotatable with the shifting sections thereof when coincident therewith, transversely-carried shafts at opposite ends thereof, cams supported thereby, arms provided with rollers engaging with said cams, spindles provided with laterally-extended lugs and suitably actuated through and by means of the cams, mechanism supported by said carriage actuated by suitable means and adapted to transmit motion to the transversely-carried shafting thereon, substantially in the manner and for the purpose described.

43. In a wire-fabric machine, the combination with a series of twister-sections arranged transversely to the length of the bed and at intervals therein, a traveling carriage, shifting sections at opposite ends thereof, a driving-shaft and suitable clutch-reversing mechanism therefor, a rack-bar supported by said carriage engaged by means intermediate the driving-shaft and adapted to impart a step-by-step movement thereto, mechanism carried by said carriage and adapted to rotate the sections of the carriage and bed, and mechanism supported at opposite ends thereof engaging means when the carriage has traveled its length in either direction to reverse the movement thereof, all substantially as described and shown.

44. In a wire-fabric machine, the combination with a shiftable carriage and twister-sections at opposite ends thereof, a series of matching twister-sections carried on said machine each provided with means by suitable power mechanism intermittingly actuated on the carriage for rotating the same when the sections of the carriage are coincident therewith, a shaft journaled in said carriage and having a bearing and sliding relation with the mechanism for imparting motion thereto, suitable gearing on opposite ends thereof intermeshing with gearing for driving the shafting journaled in said carriage and transversely to the main driving-shaft thereon, cams rotatable with the transverse shafts having continuously-formed grooves in their outer faces, suitable arms provided with rollers engaging the grooves in the cam-toothed sections at their outer ends, spindles provided with lugs on their lower ends and actuated by segmentally-toothed gears intermeshing with the toothed segments of the arms which are purposed to have an oscillating movement imparted thereto through and by means of the cams, as described for the purpose herein set forth.

45. In a wire-fabric machine, the main bed-frame, a series of twister-sections carrying strand-wires supported therein, a traveling carriage, matching twister-sections with those of the bed journaled at opposite ends in said carriage adapted to have weft-wires carried therethrough, mechanism supported by said bed and above the path of the carriage, mechanism for advancing said carriage and stopping it at intervals in the length of its movement, engaging means supported at opposite ends of said carriage adapted to contact with a suitable arm in the path of its movement, adapted through intermediate means to actuate suitable cams controlling the rotation and twisting of the cable-sections when the same are coincident with the sections of the carriage, all substantially as described and shown.

46. In a wire-fabric machine, a main bed-frame supporting twister-sections carrying line-wires therethrough and at the outer ends thereof suitable cable-sections, and centrally-disposed power mechanism on said bed and elevated above the same, a traveling carriage intermittingly actuated through suitable means to give it a step-by-step movement, twister-sections in the opposite ends thereof adapted to carry weft-wires, mechanism for simultaneously rotating the intermediate sections with the sections of the carriage independently of the means for twisting the cable-sections thereof, of suitable lugs or plates on said carriage, engaging means carried in the path thereof adapted to automatically rotate suitable cams which actuates mechanism intermediate the cable-sections for releasing the same, allowing the rotation and twisting thereof with the weft-wires carried by the twister-sections of the carriage, substantially as described and shown.

47. In a wire-fabric machine, a stationary bed-frame and a centrally-disposed power mechanism elevated above the same, strand-wire-twister sections supported in said bed and journaled at intervals in the length thereof, cable-sections at the outer and opposite ends thereof, a carriage shiftable upon said bed and provided with detachably-journaled twisting-sections at opposite ends thereof, purposed to carry weft-wires for interlacing with the strand-wires of the bed, mechanism for advancing said carriage and stopping it at intervals or when the twister-sections thereof are coincident with those of the bed, mechanism for twisting the intermediate sections independently of the mechanism for twisting the cable-sections, of suitable clutches carried adjacent to the rear ends of the cable-sections and provided with suitable gearing intermeshing with suitable gears on the inner extended ends thereof, mechanism supported on the carriage adapted to engage with mechanism for actuating suitable cams releasing the clutch-held mechanism controlling the actuation of said cable-sections and allowing the same to rotate simultaneously and twist with the sections of the carriage when the same are coincident therewith, substantially as described and shown.

48. In a wire-fabric machine, the combination with a bed-frame and twister-sections supporting strand-wires therein and located at opposite ends thereof twister-sections for supporting cable-strands, a carriage traversing the length of said bed matching twister-sections with those of the bed journaled therein and purposed to carry weft-wires to be twisted with the cable and strand sections of the bed when the same are coincident therewith, a main driving-shaft and centrally-disposed power mechanism, suitable clutch-operating parts controlling the movement thereof, an automatic shaft timed in its revolutions and controlling the rotation of said cable-sections, a clamp supported by said bed and rotatable thereon, means supported by said carriage and traveling in the path of mechanism for engaging intermediate means for causing the rotation of said automatic shaft at a time when the carriage has traversed the length of the bed and the sections thereof are coincident with the cable-sections of the bed, mechanism carried by the automatic shaft timed in its operation for the purpose of actuating suitable clutch-controlling means for transmitting power to the clamp immediately following the twisting of the cable-sections, mechanism for transmitting a longitudinal movement to said carriage, and of the means for stopping the same at intervals in the length of the bed, and mechanism for twisting the intermediate sections thereof independently of the mechanism for twisting the cable-sections, substantially in the manner and for the purpose described.

49. In a wire-fabric machine, the combination with a stationary bed, cable and strand wire twister sections journaled therein, a carriage shiftable on said bed and above said sections and provided with sections in opposite ends thereof purposed to carry weft-wires therein, a pull-out mechanism supported by said carriage and coincident with the twisting-sections thereof and actuating mechanism for the strand and cable sections of the bed, a clutch-controlling mechanism supported by the frame and engaged by intermeshing gears from the cable-sections, suitable cams, and lugs engaging therewith for retaining the clutch and cable sections in their normal positions, a centrally-disposed power mechanism, an automatic shaft and cams carried thereby, means on said carriage for actuating the automatic shaft terminating in the releasing of the clutch-controlling mechanism of the cable-sections through suitable intermediate means for the purpose of twisting the same when the sections of the carriage are coincident therewith, mechanism for advancing the carriage, and means carried thereby for automatically reversing the movement of the same, of the cam on the automatic shaft, and the rod-and-link connections adapted to actuate the clutch $U^4$ terminating in the rotation of said revolving cam, substantially in the manner and for the purpose described.

50. In a wire-fabric machine, the combination with the bed-frame, twister-sections journaled therein, a carriage shiftable thereon, a main driving-shaft imparting motion to suitable mechanism for advancing said carriage, suitable clutch-controlling mechanism intermediate the driving-shaft and carriage, mechanism carried by said carriage-actuating means in the movement thereof for reversing the movement of the clutch-operating parts to impart to the carriage a step-by-step motion as the same travels on the bed, an automatic shaft, suitable cams rotatable therewith, means carried by said carriage contacting with suitable mechanism in the movement thereof to cause the rotation of said automatic shaft, a suitable brake engaging with the clutch-controlling mechanism and actuated by the automatic shaft and timed in its operation to insure the reversal of said clutch when it is desired to reverse the movement of said carriage, a revolving clamp, and clutch-controlling mechanism intermediate the clamp and the automatic shaft and timed in its movement by suitable mechanism actuated by the automatic shaft for the purpose of revolving the clamp, in the manner and for the purpose described.

51. In a wire-fabric machine, the combination therewith of a bed-frame having journaled therein a series of twister-sections, a carriage carried thereby and shiftable thereon, twister-sections journaled in said carriage and revoluble with the sections of the bed when in the movement of the carriage they are coincident therewith, mechanism supported by said bed, actuating means for advancing said carriage, means carried by said carriage and actuated by means on the bed for causing the twister-sections to be actuated, a pull-out mechanism supported on said carriage and in a plane with the twister-sections thereof, a guiding means for the wires carried by the twister-sections of the bed, a revolving clamp, mechanism carried by said carriage adapted to engage suitable means supported on said bed to automatically actuate the shaft $W'$, and through suitable cam-and-link motion connected therewith to actuate suitable clutch mechanism intermediate said clamp purposed to cause the rotation of said clamp at a time when the carriage has traversed the length of the bed and the fabric is advanced by said clamp to suitable winding mechanism, substantially as described and shown.

52. In a wire-fabric machine, the combination with a bed-frame, a centrally-disposed power mechanism, a series of strand-wire-twister sections at graduated distances therein, and cable-sections at opposite ends thereof, of a traveling carriage, twister-sections at opposite ends thereof purposed to match and be successively twisted with the cable-strand-wire sections of the bed, mechanism for actuating said carriage to advance it in a step-by-step movement along the bed, of the mechanism for twisting the intermediate strand-wires, one or more engaging lugs supported by said carriage purposed when the carriage has traveled the length of the bed to actuate suitable mechanism for rotating the automatic shaft $W'$, of the cams 8 rotatable thereon, rods 7 contacting with suitable lugs engaging means for releasing a suitable clutch-controlling mechanism, which when the same are released the cable-twister sections are permitted to twist with the section of the carriage when the same are coincident therewith, mechanism for advancing the body of said fabric, and a clamp over which said fabric is passed, substantially in the manner described and shown.

53. In a wire-fabric machine, a bed-frame supporting a centrally-disposed power mechanism, twisting-sections carrying strand-wires arranged at intervals in the length thereof, cable-sections at opposite ends of the series, a carriage shiftable upon said bed having twister-sections purposed to support weft-wire therein arranged to travel in a step-by-step movement on said bed, a main driving-shaft, suitable gear-wheels carried by the twister-sections, a clutch-controlling mechanism for the cable-sections, intermeshing gearing between the clutch mechanism and the driving-shaft, a cam on the cable-section, intermediate mechanism engaging the cam and clutch mechanism respectively, mechanism shiftable with said carriage-engaging means, when in the movement of the same the twister-sections of the carriage are coincident with the cable-sections of the bed to release suitable mechanism for the purpose of permitting the cable-sections to twist with the sections of the carriage, in the manner and for the purpose described.

54. In a wire-fabric machine, the combination with a bed-frame and strand-wire-twister sections journaled therein, cable-sections located at opposite ends thereof, of a traveling carriage, twister-sections carrying weft-wires adapted to match successively and be twisted with the cable and intermediate sections of the bed, cams carried by said cable-sections having notched peripheral surfaces engaged by suitable lugs, a clutch-controlling mechanism, a gear-wheel supported thereby and rotatable through an intermeshing gear from a main drive-shaft, engaging means carried by said carriage with mechanism located on said bed and adapted when the sections of the carriage are coincident with the cable-sections of the bed to release the cam and clutch-operating parts to allow the same to be twisted, substantially in the manner and for the purpose described.

55. In a wire-fabric machine, the combination with a bed-frame, strand-wire-twister sections journaled therein, cable-sections at opposite ends thereof, a carriage provided with shiftable sections matching with the cable-strand-wire sections of the bed, mechanism for actuating said carriage to give it a step-by-step movement across the bed, mechanism for twisting the strand-wire sections, of the cable-sections provided with the cam 6 on their inner end portions, a clutch-engaging means controlling the rotation of said cable-sections, continuously-actuated bevel-gear intermittingly with gearing from the main drive-shaft intermediate gears thereof intermittingly actuated through said clutch, means on said carriage engaging suitable mechanism adapted to cause the release of said clutch and component parts to permit the rotation of said cable-sections when the sections of the carriage are coincident therewith, in the manner and for the purpose described.

56. In a wire-fabric machine, the combination with the bed-frame, twister-sections journaled at intervals throughout the same, centrally-disposed power mechanism supported on said bed, a carriage supported on said bed and shiftable thereon, twister-sections journaled in opposite ends thereof, a pull-out mechanism carried in a plane of the shifter-sections on the carriage and shiftable therewith, a revolving clamp, mechanism for advancing the carriage in a step-by-step movement on said bed, of the means for rotating the twister-sections of the carriage and bed simultaneously when the same are coincident the one with the other, laterally-extended lugs from said carriage and at graduated distances thereon adapted to actuate suitable mechanism for releasing the clutch $L^3$ and simultaneously throwing into gear the clutch $L^2$ for the purpose of stopping and holding the carriage at intervals as the same advances on the bed or when the twister-sections of the same are coincident with those of the bed, mechanism supported by said bed and purposed to shift the movement of the clutch $L^2$ and timed in its operation to release the clutch $L^3$ when the sections have made their twists and the carriage is purposed to advance to the adjoining section thereon, means carried by said carriage and adapted to engage with suitable mechanism for automatically reversing the movement of said carriage when the same has traversed the length of the bed, substantially as described and shown.

57. In a wire-fabric machine, the combination with a main bed-frame, strand-wire-twister sections journaled at graduated distances therein, cable-sections at opposite ends thereof, a carriage shiftable upon said bed and provided with twister-sections journaled in detachable shoes at opposite ends thereof, a main drive-shaft, centrally-disposed mechanism carried by the bed in a plane elevated above the carriage and actuated by the drive-shaft, the shaft K, clutches $L^2$ and $L^3$ revoluble thereon, intermediate mechanism from the shaft K and driven thereby adapted to actuate the carriage, and mechanism suitably engaged by means traveling with the carriage adapted to automatically stop and start the same so as to give it a step-by-step movement on the bed, the automatic shaft W', means carried thereby and actuated through suitable intermediate mechanism from the carriage to automatically reverse the movement thereof, a revolving clamp, the clutch $U^4$, of the mechanism intermediate the clutch and automatic shaft W' actuated through the cam $T^3$ carried thereby for imparting motion to the revolving clamp, substantially as described and shown.

58. In a wire-fabric machine, the combination with the main bed-frame, twister-sections journaled at graduated distances therein, a carriage shiftable on said bed, a main drive-shaft transmitting motion to a centrally-disposed power mechanism carried by said bed and in a plane above the carriage, mechanism for intermittingly advancing said carriage and for transmitting a rotary motion to the sections of the bed, the automatic shaft W', of the means supported on said carriage and adapted to contact with suitable mechanism intermediate the automatic shaft for the purpose of actuating the same which in turn automatically reverses the movement of said carriage, a clamp journaled on said bed and revoluble thereon adapted to receive the fabric as it is woven on said machine, of the cam $T^3$ on the shaft W', the clutch $U^4$, and the intermediate spring-held arms from the cam $T^3$ timed in their operation to shift the clutch-operating parts for the purpose of transmitting motion through suitable intermediate gear to the revolving clamp, substantially as described and shown.

59. In a wire-fabric-machine, the combination with a bed-frame and a series of strand-wire-twister sections journaled therein, cable-sections inclosing said strand-wire sections, a carriage shiftable on said bed and provided with twister-sections at opposite ends thereof, a pull-out mechanism on said bed adapted to grip the wires of the carriage-sections in the manner described, a revolving clamp journaled on said machine, of the mechanism for advancing said carriage in a step-by-step movement on the bed and adapted to retain the same at successive points or when the sections of the carriage are coincident with those of the bed, mechanism for twisting the intermediate sections through means carried by the carriage from suitable mechanism located on the bed, a main drive-shaft, of the automatic shaft W', and the mechanism intermediate the drive-shaft and automatic shaft, suitable engaging lugs shiftable with said carriage and adapted when the carriage has traversed the length of the bed or immediately after the intermediate sections have been twisted and the cable-sections are coincident with the sections on the carriage to actuate suitable arms supported by the shaft 35 which in turn actuates suitable mechanism intermediate the automatic shaft and controlling the rotation thereof for the purpose of transmitting motion to suitable mechanism for actuating suitable clutch-controlling parts to cause the simultaneous rotation of the cable-sections with those of the section of the carriage, of suitable mechanism timed in its operation and actuated by the automatic shaft to cause the rotation of the revolving clamp immediately following the twisting of the cable-sections, and of mechanism for reversing the movement of said carriage simultaneously therewith, substantially in the manner herein shown.

In testimony whereof we affix our signatures in presence of two witnesses.

PETER SOMMER.
JOHN SOMMER.
PETER W. SOMMER.

Witnesses:
CHAS. W. LA PORTE,
W. V. TEFFT.